United States Patent
Hashimoto et al.

(10) Patent No.: US 7,751,376 B2
(45) Date of Patent: *Jul. 6, 2010

(54) SYSTEM FOR ESTABLISHING DATA TRANSMISSION PATH BETWEEN MOBILE PHONE TERMINALS

(75) Inventors: Masanori Hashimoto, Yokohama (JP); Yasuo Tezuka, Yokohama (JP); Akio Yaba, Yokohama (JP); Kayo Motohashi, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/086,135

(22) Filed: Mar. 22, 2005

(65) Prior Publication Data
US 2006/0084470 A1    Apr. 20, 2006

(30) Foreign Application Priority Data
Oct. 19, 2004    (JP)    ............................. 2004-304279

(51) Int. Cl.
*H04W 4/00*    (2009.01)
(52) U.S. Cl. .................. 370/338; 370/328; 370/326; 370/341; 455/422.1; 455/561
(58) Field of Classification Search .................. 370/351, 370/352, 328, 329, 338, 341; 455/428, 338, 455/351, 328, 341, 426, 422.1, 561
See application file for complete search history.

(56) References Cited

U.S. PATENT DOCUMENTS

| | | | |
|---|---|---|---|
| 5,924,042 A * | 7/1999 | Sakamoto et al. | ........... 455/458 |
| 6,349,324 B1 | 2/2002 | Tokoro | |
| 6,614,784 B1 | 9/2003 | Glitho et al. | |
| 7,151,765 B2 * | 12/2006 | Zhang et al. | ................. 370/338 |
| 2003/0032414 A1 * | 2/2003 | Melaku et al. | .............. 455/415 |
| 2003/0224820 A1 | 12/2003 | Einola et al. | |

(Continued)

FOREIGN PATENT DOCUMENTS

JP    2002-53588    10/1990

(Continued)

OTHER PUBLICATIONS

Notice of Reason for Rejection dated Nov. 24, 2009, from the corresponding Japanese Application.

*Primary Examiner*—Nghi H Ly
(74) *Attorney, Agent, or Firm*—Katten Muchin Rosenman LLP

(57) ABSTRACT

In a network system including base stations accommodated in a mobile phone network through an IP network, when a mobile phone terminal as a calling terminal makes a calling request and the calling request from the calling terminal is sent through a source base station to the mobile phone network and then from the mobile phone network through a destination base station to a mobile phone terminal as a called terminal, it is judged whether the source base station and the destination base station are both connected to the mobile phone network through the same IP network, and when the source base station and the destination base station are both connected to the mobile phone network through the same IP network, a data transmission path is established between the calling terminal and the called terminal that directly connects the source base station and the destination base station through the same IP network and without via the mobile phone network.

33 Claims, 18 Drawing Sheets

U.S. PATENT DOCUMENTS

| | | | |
|---|---|---|---|
| 2004/0017814 A1* | 1/2004 | Shimada | 370/395.52 |
| 2004/0131165 A1 | 7/2004 | Ebisawa et al. | |
| 2004/0259595 A1* | 12/2004 | Yang | 455/561 |
| 2005/0089007 A1 | 4/2005 | Semper | |
| 2005/0096024 A1* | 5/2005 | Bicker et al. | 455/417 |
| 2007/0197209 A1* | 8/2007 | Hashimoto et al. | 455/426.1 |

FOREIGN PATENT DOCUMENTS

| | | |
|---|---|---|
| JP | 11-122388 | 4/1999 |
| JP | 11-234642 | 8/1999 |
| JP | 2000-125040 | 4/2000 |
| JP | 2001-203806 | 7/2001 |
| JP | 2001-257797 | 9/2001 |
| JP | 2003-125032 | 4/2003 |
| JP | 2004-507946 | 3/2004 |
| JP | 2006-524932 | 11/2006 |

* cited by examiner

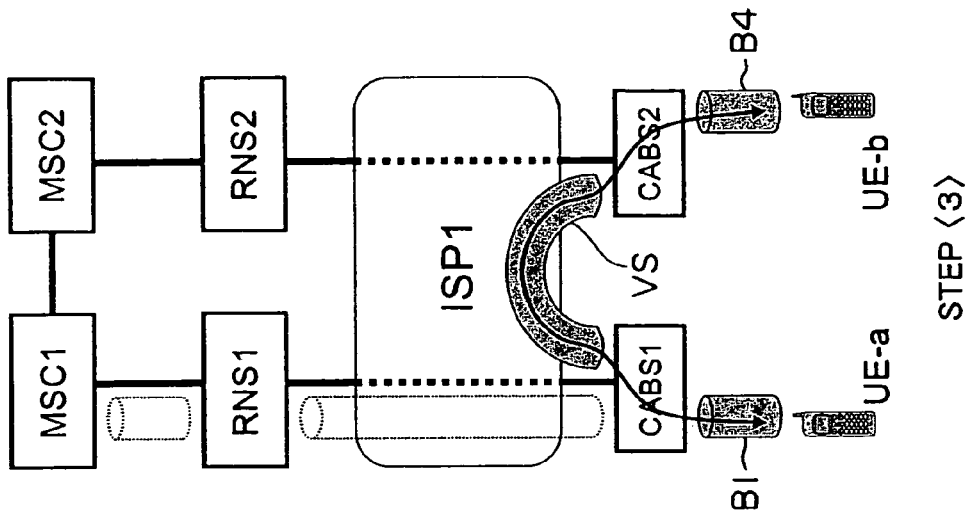
FIG. 7C  STEP ⟨3⟩
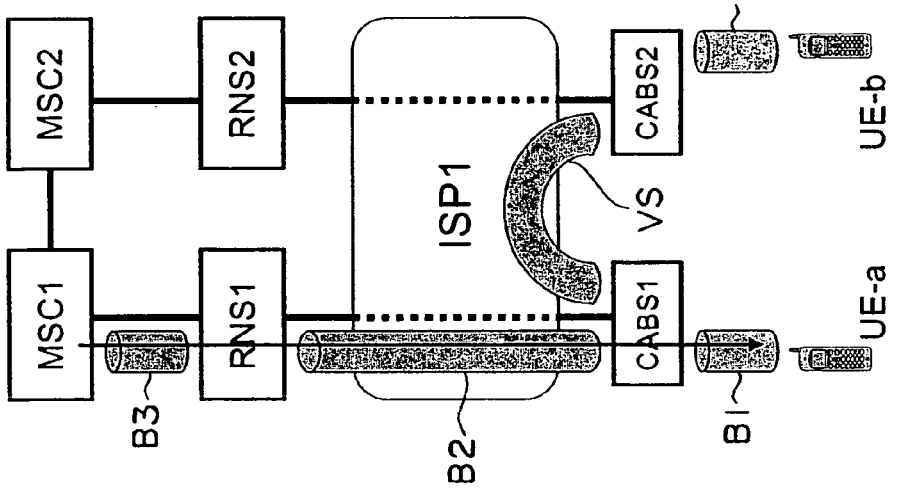
FIG. 7B  STEP ⟨2⟩
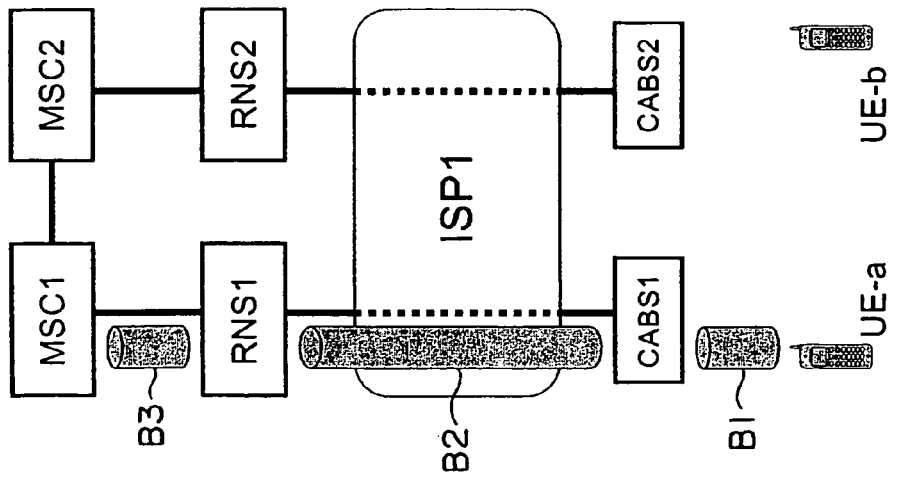
FIG. 7A  STEP ⟨1⟩

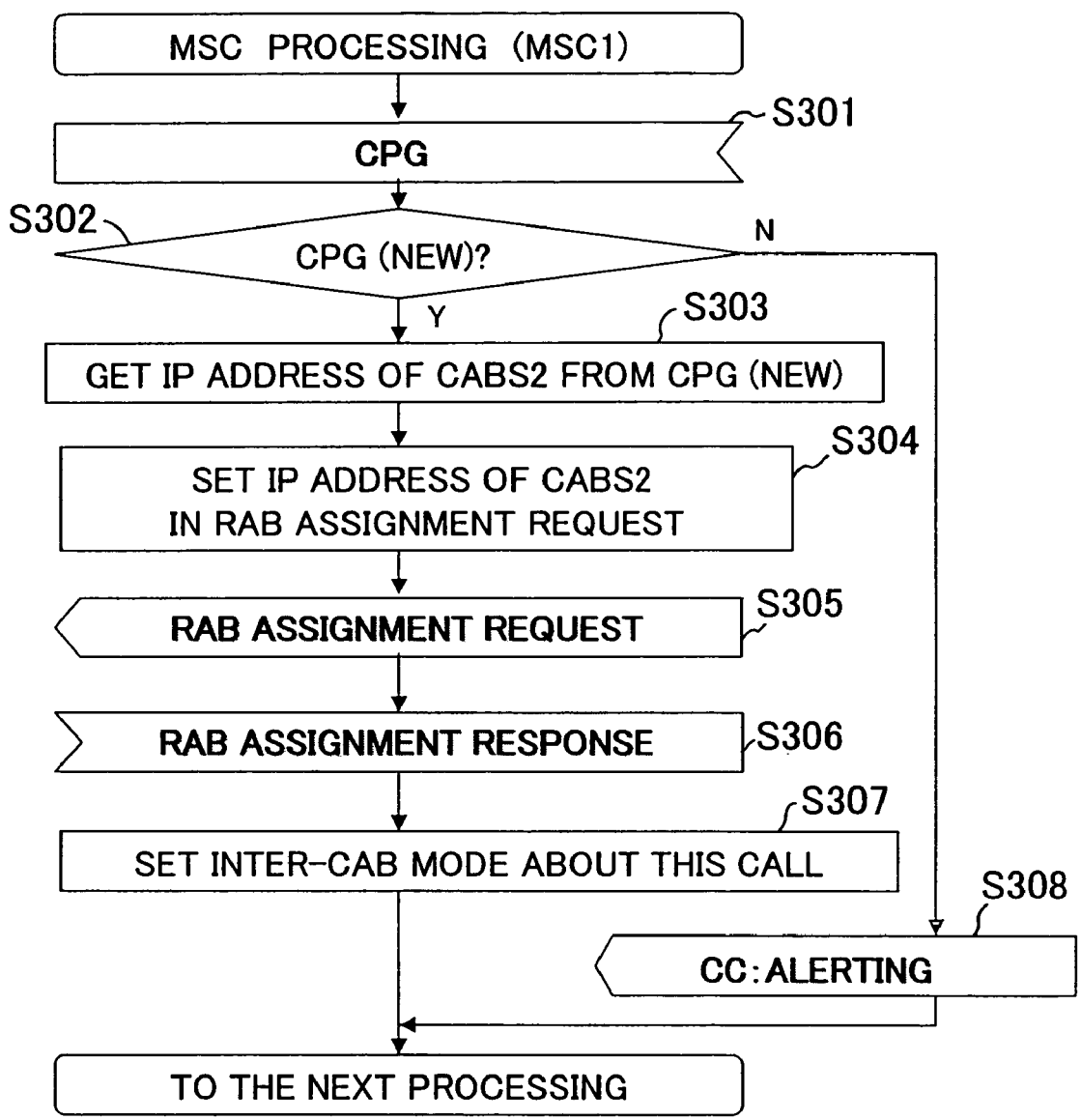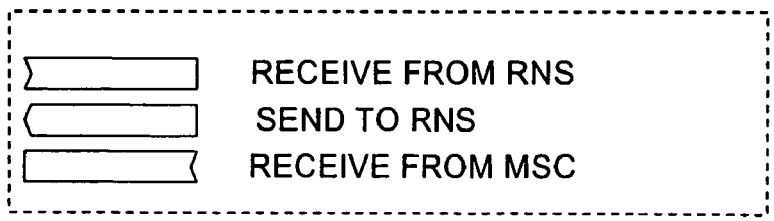

FIG. 15
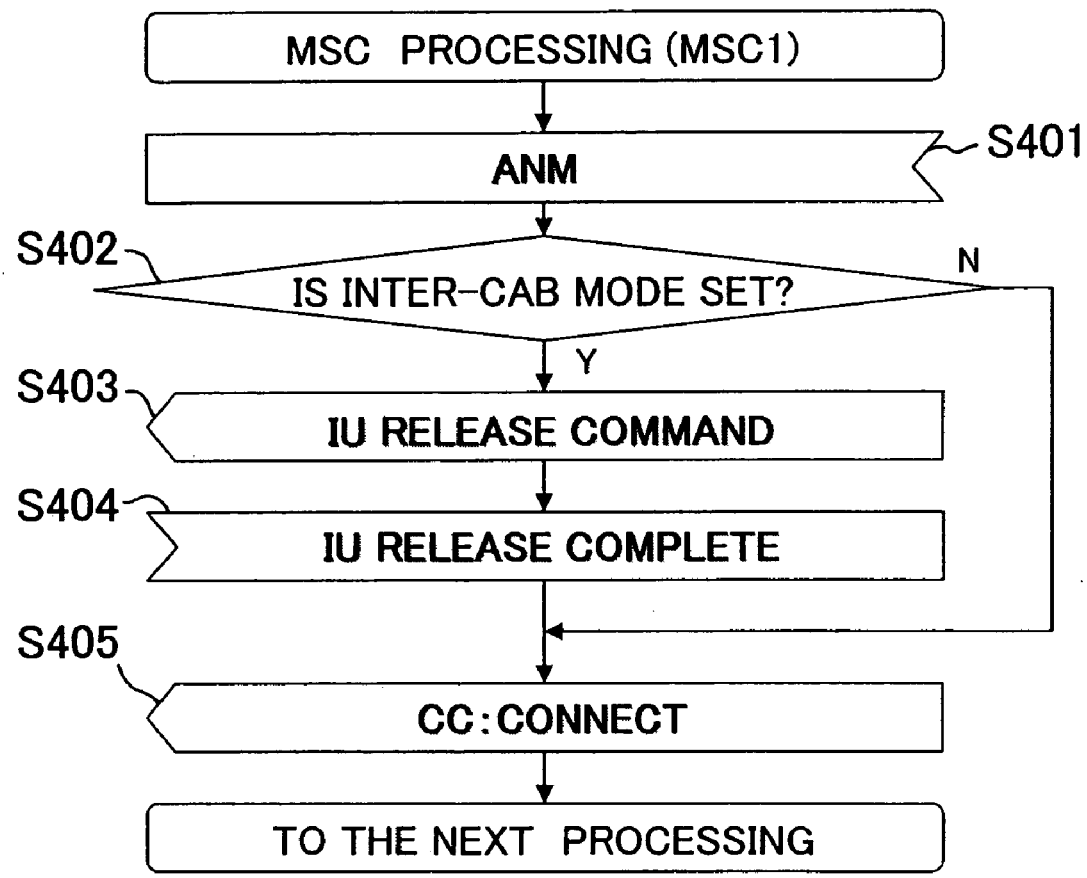
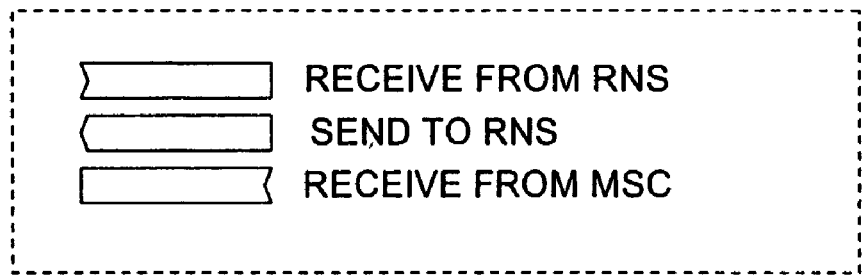

SYSTEM FOR ESTABLISHING DATA TRANSMISSION PATH BETWEEN MOBILE PHONE TERMINALS

BACKGROUND OF THE INVENTION

The present invention relates to a communications system that uses a mobile phone network and an IP (Internet Protocol) network.

In a mobile phone network, e.g., in a Third Generation mobile phone network, there are areas which are geographically within the service area (the area within which radio waves from base stations reach) but where the reception of radio waves involves difficulties (such areas are called insensible areas). This is because it is occasionally difficult to sufficiently receive radio waves from base stations behind or within buildings or underground, since radio waves basically travel straight.

Such insensible areas include the interiors of buildings, specifically the interiors of individuals' homes, such as detached homes or apartment houses. It is therefore demanded to provide small-sized base stations within the homes of individuals so that radio waves from the mobile phone network can be smoothly received in the homes.

Background arts related to the present invention include the techniques described in the Patent documents 1 and 2 below, for example:

[Patent document 1] JP 2004-507946 A
[Patent document 2] JP 2002-535888 A

SUMMARY OF THE INVENTION

An object of the present invention is to provide a technique that allows efficient utilization of a mobile phone network and an IP network using base stations accommodated in the mobile phone network through the IP network.

The present invention adopts the following configurations to achieve the object.

That is, the present invention relates to a system for establishing a data transmission path between mobile phone terminals in a network system including base stations accommodated in a mobile phone network through an IP network, the system including:

a judging unit for judging whether a source (calling-side) base station and a destination (called-side) base station are both connected to the mobile phone network through the same IP network when a mobile phone terminal as a calling terminal makes a calling request and the calling request from the calling terminal is sent through the source base station to the mobile phone network and then from the mobile phone network through the destination base station to a mobile phone terminal as a called terminal; and an establishing unit for establishing a data transmission path between the calling terminal and the called terminal that directly connects the source base station and the destination base station through the same IP network and without via the mobile phone network, when the source base station and the destination base station are both connected to the mobile phone network through the same IP network.

According to the present invention, the data transmission path established between terminals directly connects the source base station and the destination base station. This reduces traffic on the mobile phone network and the IP network. This, in turn, reduces network loads and burdens of provision of facilities.

In the present invention, the word "data" may include voice and voice data as well as text and image data.

Preferably, according to the present invention, when the source base station and the destination base station are not connected to the mobile phone network through the same IP network, a data transmission path between the calling terminal and the called terminal is established via the mobile phone network.

Also, preferably, according to the present, when at least one of the calling terminal and the called terminal belongs to a base station that is connected to the mobile phone network without through an IP network, a data transmission path between the calling terminal and the called terminal is established via the mobile phone network.

As described above, when the base stations are not connected to the same IP network, and when at least one of the calling terminal and the called terminal is subordinate to a base station that is not connected to the mobile phone network through an IP network, the data transmission path is established via the mobile phone network. Thus, when a data transmission path directly connecting the base stations cannot be established, a data transmission path is established through the mobile phone network, thereby the data communication between the terminals is guaranteed.

The present invention relates to a network system including a mobile phone network having a first base station control device as a source base station control device, a second base station control device as a destination base station control device, and at least one switch for connecting the first base station control device and the second base station control device, wherein:

when a mobile phone terminal as a calling terminal makes a calling request and the first base station control device receives the calling request from a source base station connected thereto through an IP network, the first base station control device adds, to the calling request, identification information about the IP network to which the source base station is connected and an IP address of the source base station;

when the second base station control device receives the calling request through the at least one switch and sends the calling request to a mobile phone terminal as a called terminal through a destination base station connected to the second base station control device through an IP network, the second base station control device checks whether the identification information about the IP network that is contained in the calling request coincides with identification information about the IP network to which the destination base station is connected; and when the two pieces of IP network identification information coincide with each other, the second base station control device informs the destination base station of the IP address of the source base station contained in the calling request and also informs the source base station of an IP address of the destination base station, and the first and second base station control devices provide an instruction to the source base station and the destination base station to establish a data transmission path between the calling terminal and the called terminal which directly connects the source base station and the destination base station through the same IP network and without via the mobile phone network.

Preferably, according to the present invention, the first base station control device adds, to the calling request, the identification information, the IP address, and identification information about the data transmission path to be established between the source base station and the destination base station.

Thus, even when a plurality of data transmission paths for a plurality of pairs of terminals are simultaneously established between the source base station and the destination base station, it is possible to identify each data transmission path to establish a data transmission path and transmit data.

Preferably, according to the present invention, upon reception of the calling request, the first base station control device and the at least one switch establish a data communication path extending between the first base station control device and the source base station and between the first base station control device and the switch, the at least one switch sends a ring tone to the source base station using the data communication path during a calling to the called terminal, and the source base station sends (transmits), to the calling terminal, the ring tone received through the data communication path.

This allows the ring tone from the mobile phone network to be connected to the calling terminal.

Preferably, when the data transmission path is established between the source base station and the destination base station and the called terminal responds to the calling, the at least one switch and the first base station control device according to the present invention delete the data communication path established between the first base station control device and the source base station and between the first base station control device and the switch.

Thus, deleting (releasing) the data communication path no longer in use avoids waste of resources of the IP network and the mobile phone network.

The present invention relates to a base station connected to a mobile phone network through an IP network, including:

a receiving unit that receives a calling request from a mobile phone terminal as a calling terminal;

a sending unit that sends the calling request to the mobile phone network through the IP network; and a data transmission path establish/disconnect unit, in which, when the calling request arrives at a mobile phone terminal as a called terminal via another base station connected to the mobile phone network through the same IP network, the data transmission path establish/disconnect unit receives an IP address of that another base station from the mobile phone network or from that another base station, and the data transmission path establish/disconnect unit establishes, using the IP address, a data transmission path between the calling terminal and the called terminal that directly connects the base station and that another base station through the same IP network and without via the mobile phone network. (8)

Preferably, a data communication path is established between a base station and the calling terminal according to the present invention, in order to transmit data communicated with the calling terminal, and data transmitted on the data communication path is enciphered according to a cipher defined between the calling terminal and the mobile phone network, and in which, the base station further includes:

a cipher/decipher unit that deciphers the enciphered data from the data communication path and that enciphers, according to the cipher, data to be sent onto the data communication path;

a first route for data passing through the cipher/decipher unit;

a second route for data not passing through the cipher/decipher unit;

a connection unit that connects data transmitted between the calling terminal and the called terminal through the mobile phone network to the second route, and that connects data transmitted between the calling terminal and the called terminal through the data transmission path to the first route; and a connection control unit that controls the route connection made by the connection unit in accordance with establishment/disconnection of the data transmission path.

The base stations and terminals do not know the cipher applied to the other party's base station and terminal. Therefore, they cannot decipher data even when they receive enciphered data through the data transmission path. However, in the configuration above, data is sent to the other party in deciphered form. This avoids the problem in that the other party is unable to decipher received data.

The present invention can also realize an invention of a method having features similar to those of the systems and base stations described above.

The present invention achieves efficient utilization of a mobile phone network and an IP network by using small-sized base stations connected to the mobile phone network through the IP network.

BRIEF DESCRIPTION OF THE DRAWINGS

FIGS. 7A, 7B and 7C show a transition of bearers in a call connection process according to the present invention;

FIG. 14 is a flowchart of a process performed by a source MSC (S-MSC) according to the embodiment of the present invention;

FIG. 15 is a flowchart of a process performed by the source MSC (S-MSC) according to the embodiment of the present invention;

DETAILED DESCRIPTION OF THE INVENTION

Figure 1:
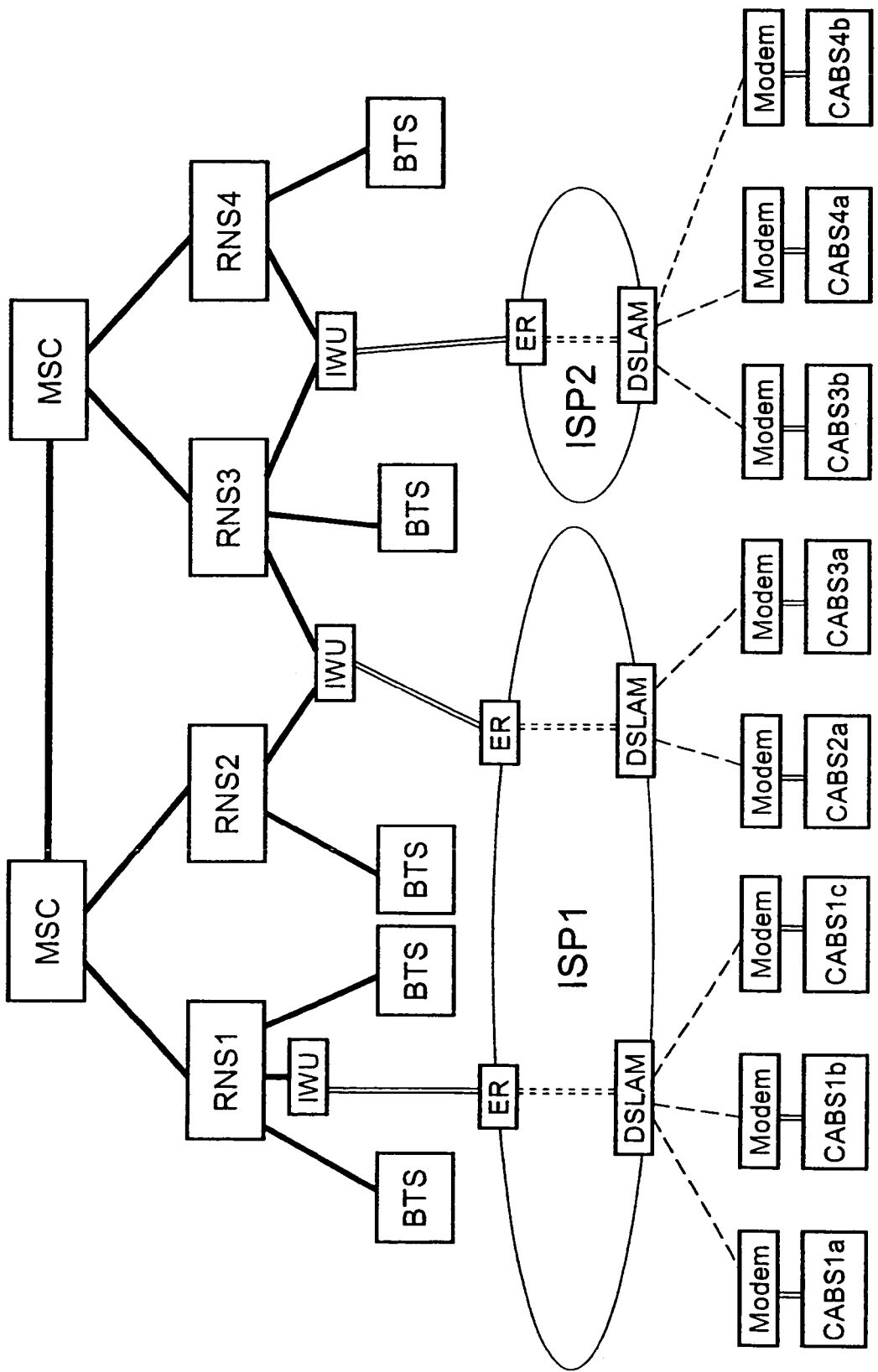
FIG. 1 shows an example of a configuration of a mobile phone network to which the present invention is applicable.

The present invention is now described referring to the drawings. The configurations shown below are in all aspects illustrative and do not restrict the present invention.

Circumstances of the Invention

First, the circumstances of the present invention are described. Insensible areas within a mobile phone network service area include the interiors of individuals' homes (user homes) such as detached homes and apartment houses. It is demanded to provide small-sized radio base stations in the user homes to allow mobile phone users to use the phones in the homes. As compared with common base stations provided, such small-sized base stations for home provision are preferably configured to meet the requirements below.

(1) To allow provision in the home, such a base station should be small-sized, low-priced, have a small service area (the area within which radio waves from the small base station reach), and provide low-power output (to minimize interference with other similar base stations).

(2) Provision of a physical line is required between a base station device and a base station control device to form a network. As for the physical line, data is sent/received by utilizing an IP packet transmission path on a broadband line service for connection to the Internet which is now coming into wide use at homes (e.g., xDSL (x Digital Subscriber Line) or CATV (Cable TV) Internet connecting services).

(3) Individual users will bear the expenses of such small-sized base stations for provision in their homes.

From these viewpoints, an authentication function is provided between a base station control device (RNS: Radio Network Sub-system) and a small-sized base station to authorize only the user providing the small-sized base station (and related people) to make a connection to the small-sized base station (a function for authentication between the terminal and the small-sized base station).

FIG. 1 is a diagram showing an example configuration of connections between a mobile phone network and small-sized base stations. In FIG. 1, MSCs (Mobile services Switching Centers) are switching devices (switches) of the mobile phone network. The MSCs are connected to each other and each accommodates at least one RNS. The RNSs are base station control devices for controlling their subordinate base stations. Each RNS accommodates at least one BTS (Base Transceiver station). The BTSs are base stations that perform radio communication with terminals (mobile stations or UE (user equipment)). The mobile phone network includes those elements.

FIG. 1 shows part of a 3G (IMT-2000) UMTS (Universal Mobile Telecommunication System) as an example of a mobile phone network. In general, the UMTS is formed of a core network and an access network (UTRAN (Universal Terrestrial Radio Access Network) to the core network. The UTRAN includes radio sections. The MSCs of FIG. 1 are components included in the core network and the RNSs and BTSs are components included in the UTRAN.

CABSs (Cubicle Area BTSs) of FIG. 1 correspond to the small-sized base stations for provision in the homes. The CABSs are usually provided within user homes and connected to RNSs of the mobile phone network through an ISP (Internet Service Provider) network (IP network).

The example of FIG. 1 assumes that each user home is provided with an Internet connection broadband line (e.g., xDSL) by an ISP. Each CABS is connected to an IP interface of an xDSL modem accommodating a fixed telephone line used as the broadband line. Each xDSL modem is connected to a DSLAM (Digital Subscriber Line Access Multiplexer) provided on the ISP network through an xDSL line distributed from the fixed telephone line.

Each RNS is connected, via an IWU (Inter-Working Unit) to an edge router (ER) provided at the entrance of the ISP network. The mobile phone network and the ISP network are thus connected to each other.

The IWU is a conversion device between the IP layer and the ATM (Asynchronous Transfer Mode) which is a lower layer of the existing mobile phone network. RNS and ER are connected through channels of a number corresponding to the amount of calls from the mobile phone network.

Thus, physically, the CABSs are connected through fixed telephone lines. Also, the CABSs are connected to RNSs through the IP interfaces. Thus, all of CABSs connected to a certain ISP network are accommodated in the mobile phone network through the ISP (IP) network.

In this way, when CABSs are connected to the mobile phone network using broadband lines (environments for connection to ISP) that are already installed in the homes, there is no need to provide each home with a special line for connection to the mobile phone network (RNSs). This reduces costs for the introduction of CABSs.

Also, the CABSs have a function of permitting only particular terminals to be connected to themselves. Specifically, when a CABS receives a connection request from a terminal, the RNS/MSG performs an authentication process for the CABS. When the result of the authentication indicates that the connection-requesting terminal is a connection-permitted terminal, the CABS then authorizes the connection request from the terminal.

Figure 2:
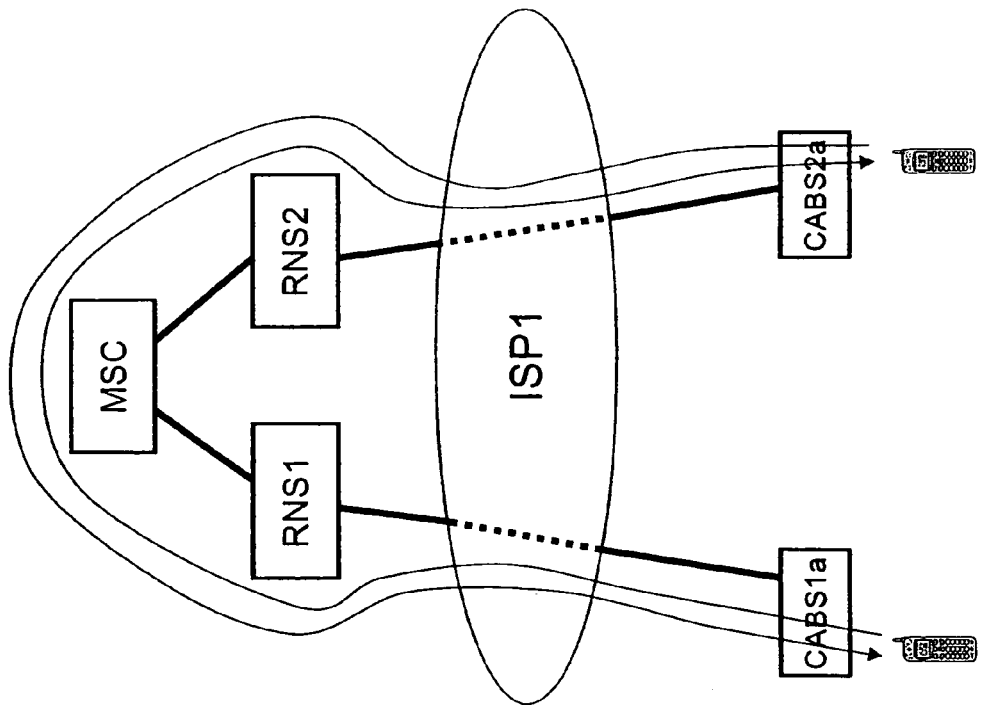
FIG. 2 shows a bearer route for voice data in an existing system.

FIG. 2 shows a system that accommodates such CABSs as shown in FIG. 1, where two CABSs are accommodated in the same ISP network and terminals communicate with each other through the two CABSs.

As can be clearly seen from FIG. 2, the data exchanged between the terminals (e.g., voice data in a case of a voice call) passes through the route of CABS1*a*-RNS1-MSC-RNS2-CABS2*a* (see the arrows in FIG. 2). In this case, the data sent/received between the terminals passes through the ISP network (IP network) twice.

Figure 3:
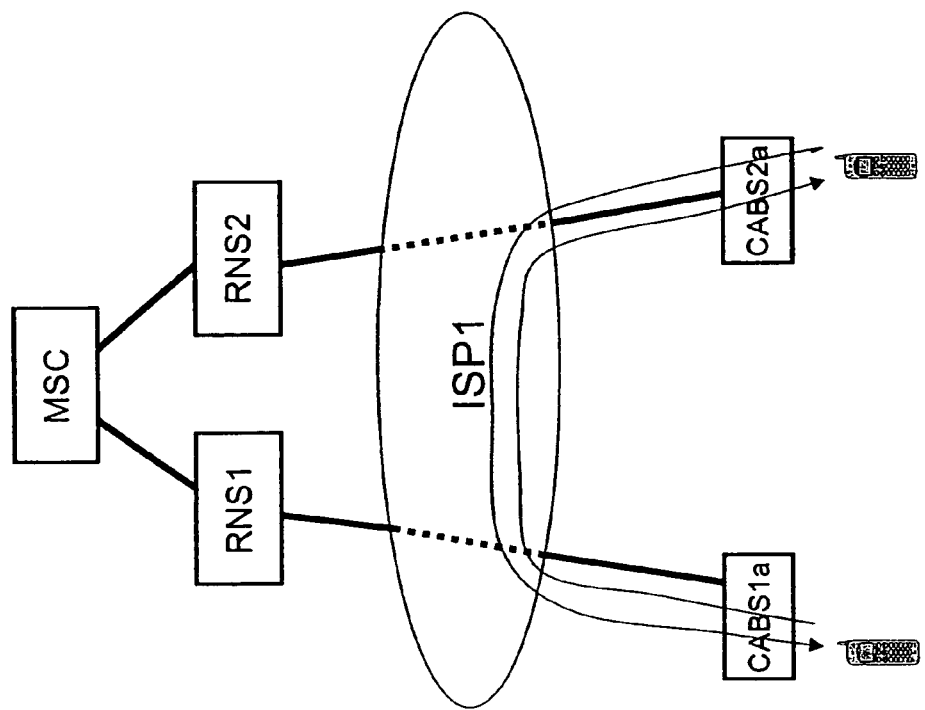
FIG. 3 is shows a bearer route for voice data according to the present invention.

If, as shown in FIG. 3, the data can be sent/received between the terminals through a direct connection between the CABSS, i.e., without passing through the mobile phone network, the traffic through the ISP network is halved as compared with the case of FIG. 2. This is clearly advantageous also in the aspect of facilities because the traffic between the CABSs does not pass through the mobile phone network located above the ISP network.

Each CABS has an IP address uniquely assigned in the ISP. If each CABS knows IP addresses of other CABSs, they can exchange IP packets (e.g., IP packets containing voice data) in a direct manner (without passing through the mobile phone network).

Figure 4:
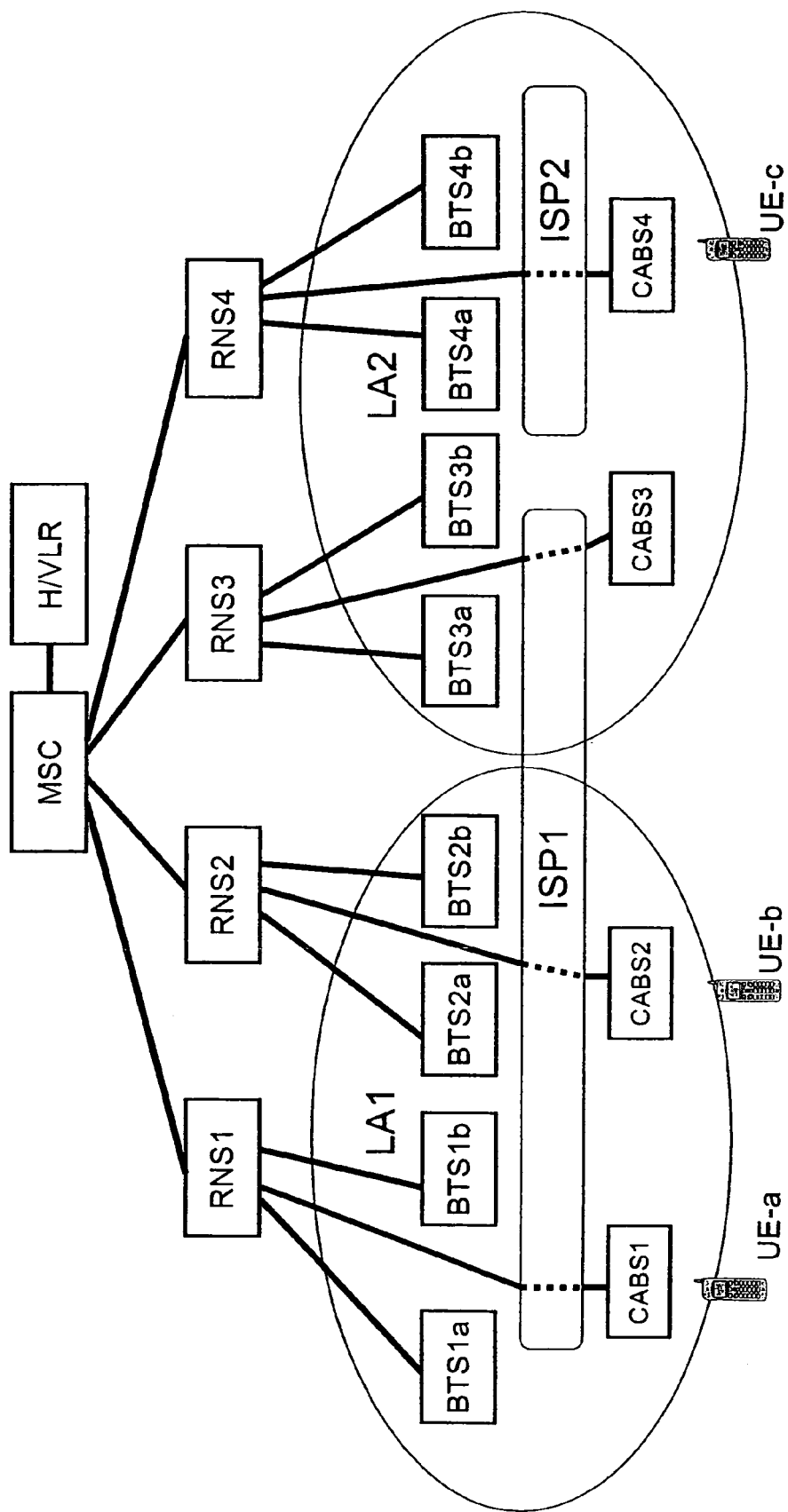
FIG. 4 shows an example of configuration used to describe a problem solved by the present invention.

However, implementing a service for directly connecting CABSs as shown in FIG. 3 encounters a big problem. FIG. 4 is a network configuration diagram used to describe the problem. In FIG. 4, suppose that a terminal UE-a (which is capable of making a radio connection with a CABS1) sends a call to a terminal UE-b (which is capable of making a radio connection with a CABS2). Then, through a series of calling procedures, a control signal from the terminal UE-a is transferred through the CABS1-RNS-MSC route and the MSC settles the reception at the terminal UE-b.

However, existing mobile phone networks grasp the current position of each terminal only as a unit called LA (Location Area). The LA is formed of a relatively large area to which a plurality of RNSs/BTSs (including CABSs) belong. The MSC is connected to a terminal location register information recording device called H/VLR (Home/Visitor Location Register), where the H/VLR is configured to register identification information about terminals present within each LA.

The MSC refers to the H/VLR in accordance with the control signal from the terminal UE-a and reads the LA in which the called terminal is present as the destination area LA. In this example, the terminal UE-b is in the LA1, so the MSC sends a call receive request message to all RNSs (RNS1 and RNS2 in this example) that belong to the LA1.

Each of the RNS1 and RNS2 sends the call receive request message to all of its subordinate BTSs (including CABSs). Then, the terminal UE-b receives the call receive request message through the CABS2 to which the terminal UE-b is connected.

The terminal UE-b thus receives the call receive request message from the CABS2 and responds to the call receive request message (sends a response signal) to indicate its location. The response signal travels through the CABS2, RNS2 and MSC, and further through the RNS1 and CABS1, to reach the terminal UE-a so as to report the response from the terminal UE-b. The communication route is thus determined and the RNC/MSC ensure (capture) the communication path (a bearer channel) for transferring voice data between the terminals.

During this process, the MSC only ensures the bearer channel with the RNS1 and the RNS2 and does not know (or does not have to know) under which BTSs or CABSs the terminals are located.

Accordingly, when establishing the bearer, the MSC is unable to judge whether a direct bearer (not passing through the mobile phone network) can be established between the CABS1 and CABS2 (or unable to judge whether the CABS1 and the CABS2 belong to the same ISP network). Also, the MSC is unable to inform the CABS1 and CABS2 which CABS they are corresponding with.

Furthermore, in the existing system, each of the RNS1 and RNS2 is only capable of knowing the state of its own subordinate CABS and has no function of knowing about the CABS of the other RNS. Therefore it is not possible to judge whether to establish a bearer directly connecting the CABSs.

Summary of the Invention

According to the present invention, instead of a bearer channel for voice data between terminals that is established by RNS/MSC, a bearer channel directly connecting CABSs through an IP network is established.

The establishment is realized by letting the CABS1 and CABS2 know each other's IP addresses in the ISP upon reception of a response from the terminal (the ISP network is an IP network).

However, in existing systems, the IP address of a CABS is known only by its superior RNS. That is, only the RNS1 knows the IP address of the CABS1 and only the RNS2 knows the IP address of the CABS2. Therefore means is needed to let the CABSs know each other's IP addresses.

The CABS1 and CABS2 can establish a bearer for their direct data transmission when they are connected to the same ISP. Therefore a measure is required to judge whether the CABS1 and the CABS2 are connected to the same ISP (in other words, it is necessary to judge whether the RNS1 and RNS2 and the CABS1 and CABS2 are connected to the same IP network).

Also, it is necessary to judge whether to establish a bearer through MSC-RNS-CABS on the basis of the judgment described above. A configuration for achieving objects of the present invention is described below.

Figure 5:
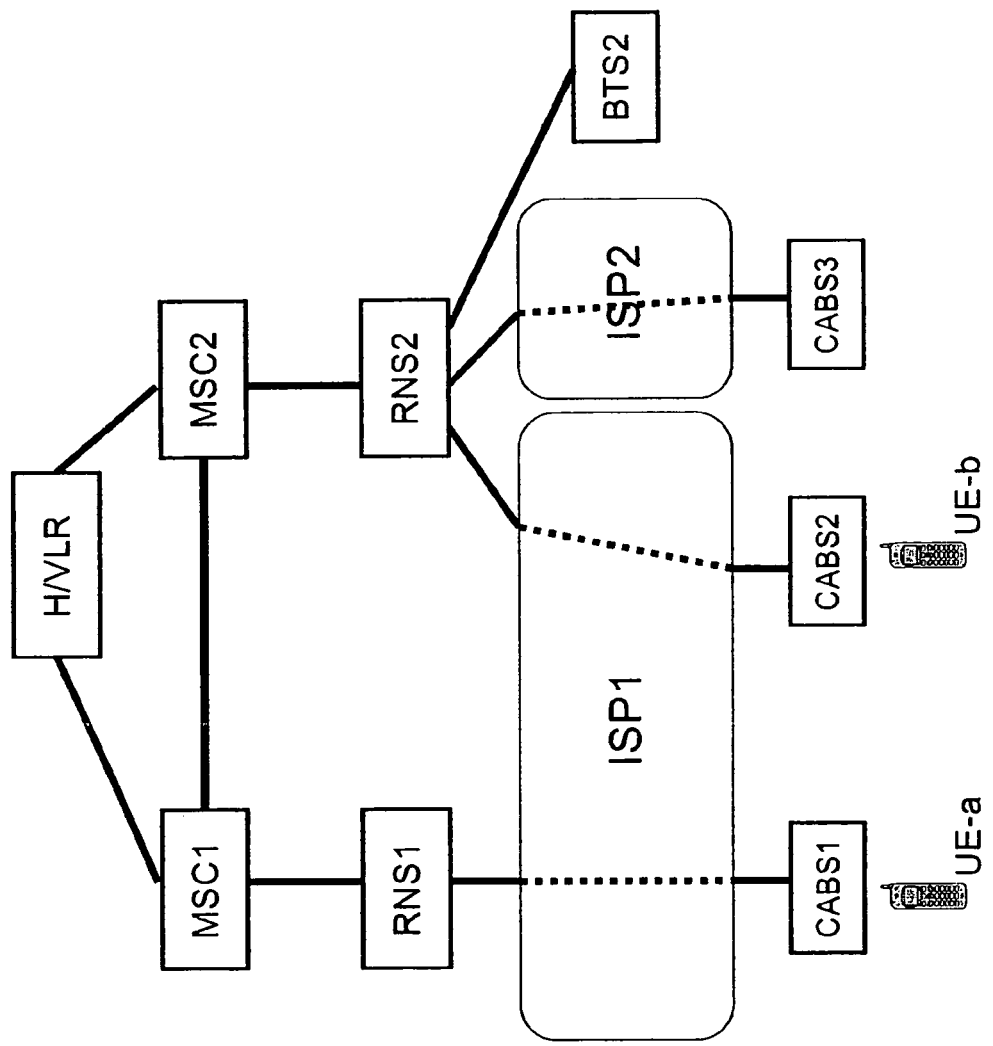
FIG. 5 shows an example of configuration used to describe the outlines and embodiment of the present invention.

FIG. 5 is a diagram showing an example of a network configuration used to describe the present invention, which only shows components and devices required for the description. The network configuration assumes the UMTS as an example.

The H/VLR is a terminal location register storage device in which locations of terminals (LAs where terminals are present) are registered. The MSC1 and MSC2 are switching devices (switches) of a mobile phone network. The RNS1 and RNS2 are base station control devices. The CABS1 and CABS2, and a CABS3 are small-sized radio base station devices for home provision (the base stations of the present invention). The BTS2 is a common base station.

Figure 6:
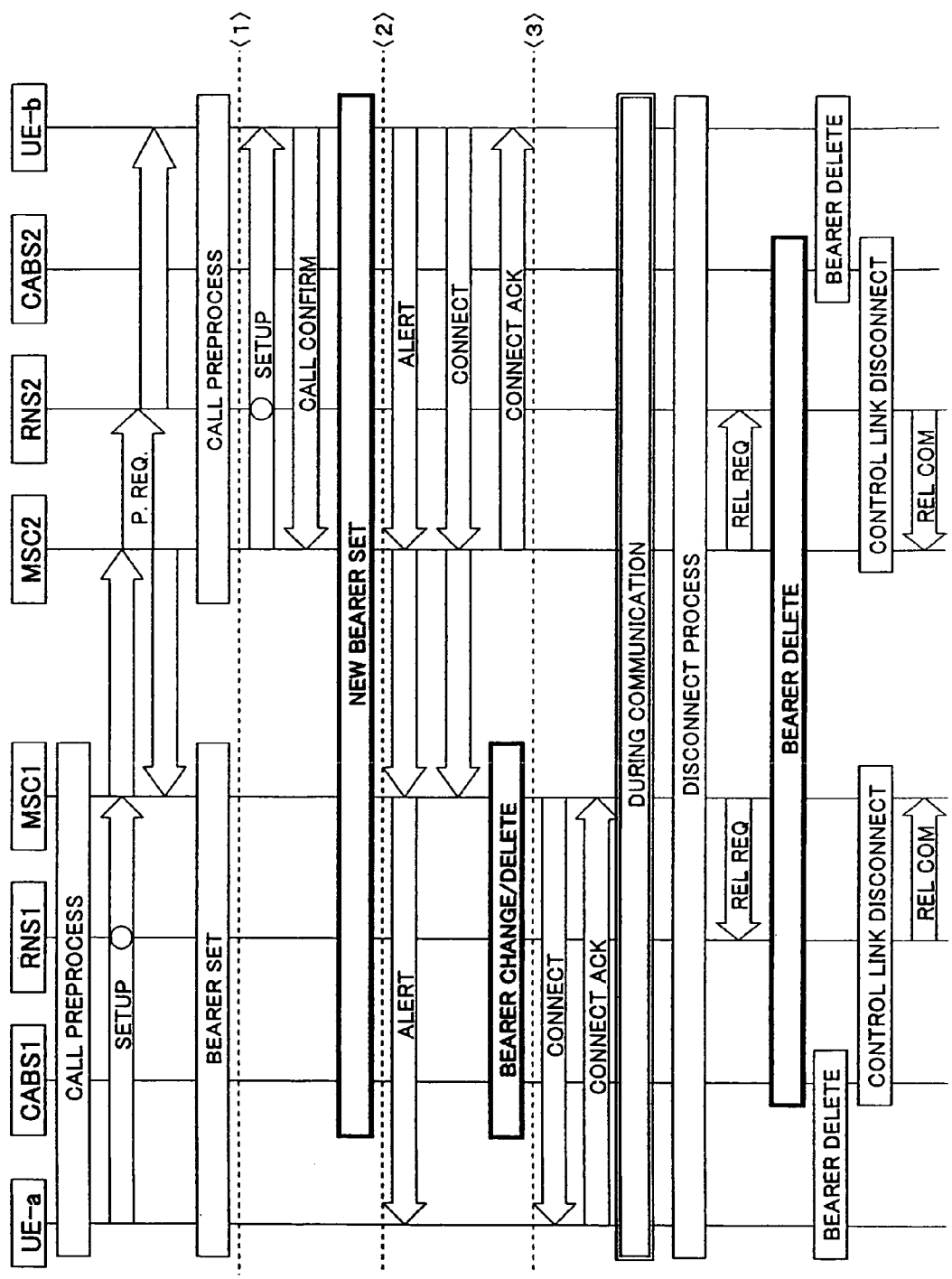
FIG. 6 is a sequence chart showing the outlines of the present invention.

In FIG. 5, suppose that the mobile phone terminal (hereinafter referred to simply as a terminal) UE-a makes a call and the terminal UE-b receives the call. FIG. 6 is a sequence diagram showing the outlines of operations performed in this case. FIG. 7 is a state transition diagram corresponding to the sequence of FIG. 6.

In the sequence of FIG. 6, the terminal UE-a corresponds to a calling terminal. The CABS1 corresponds to a source base station. The RNS1 corresponds to a first base station control device. The MSC1 and the MSC2 correspond to at least one switch. The RNS2 corresponds to a second base station control device. The CABS2 corresponds to a destination base station. The terminal UE-b corresponds to a called terminal.

In FIG. 6, when the terminal UE-a makes a call, a CALL PREPROCESS starts (S01). This preprocess includes the establishment of a radio control link, the network authentication of the terminal UE-a (for checking whether the terminal UE-a can receive services of the mobile phone network), the exchange of cipher/decipher keys for radio sections, and so on. The preprocess is totally the same as an existing one.

Then, the terminal UE-a sends a "SETUP", a call setup signal (a calling request), to the network (S02). The "SETUP" contains the telephone number of the called terminal (the terminal UE-b) which is the destination of the call. The CABS1 receives the "SETUP" and sends the "SETUP" to the RNS1 (source-RNS: S-RNS), and the RNS1 sends the "SETUP" to the MSC1.

In this process, the RNS1 is capable of recognizing (judging) that the "SETUP" was sent from a CABS by, e.g., recognizing that the "SETUP" was received from an IP interface (IP network). The RNS1 is also capable of knowing that the source of the "SETUP" is the CABS1 by detecting the source IP address of the "SETUP". In this case, the RNS1 adds, to the "SETUP" that is next sent to the MSC, the IP address of the CABS1 and the identifier of the ISP1 relaying between the RNS1 and the CABS1 (ISP-ID: which corresponds to identification information about the IP network) (S02A). This is a first feature of the present invention.

On the other hand, when the "SETUP" is not sent through an IP network (when it is sent from a common BTS), no IP address and no ISP-ID are added thereto.

Finally, the MSC1 receives the "SETUP" and inquires of the H/VLR for the location of the destination terminal on the basis of the telephone number of the destination terminal (the called terminal). When the response from the H/VLR indicates that the destination terminal UE-b is in the location register area (LA) under the MSC2, the MSC1 sends the SETUP message to the MSC2 (S03).

The MSC2 first generates a call receive request message (PAGE REQUEST) on the basis of the "SETUP" from the MSC1 and sends the message to all RNSs within the location register area (S04). At the same time, the MSC2 sends back to the MSC1 a response to the "SETUP" (S05) to inform the MSC1 that a call connection operation has started.

When the MSC1 receives the response, the MSC1 makes preparations for the communication by performing a bearer setting procedure (BEARER SET) for establishing a bearer (a data communication path) for the voice data transmission to the terminal UE-a (S06).

The image of the bearer established by the steps described so far (the steps shown above the broken line <1> of FIG. 6: S01 to S06) is illustrated as the step <1> in the bearer establishment transition diagram of FIG. 7(A). That is, through these process steps S01 to S06, a bearer B1 (a first data communication path), a bearer B2 (a second data communication path), and a bearer B3, which are used in the voice data communication between the terminals UE-a and UE-b, have been established respectively between the terminal UE-a and the CABS1, between the CABS1 and the RNS1, and between the RNS1 and the MSC1.

Referring to FIG. 6 again, the RNS (destination-RNS: D-RNS) receives the call receive request message and sends the call receive request message to all base stations under the RNS (S07). The base stations receive the call receive request message, convert the call receive request message to a radio signal, and send the radio signal. Thus, in the example of FIG. 5, the call receive request message from the MSC2 is transmitted, through the RNS2, to each of the CABS2, CABS3, and BTS2.

The call receive request message contains the terminal number of the terminal UE-b and therefore only the destination terminal UE-b is capable of responding to the call receive request message. In this example, the terminal UE-b receives the call receive request message through the radio signal from the CABS2.

The terminal UE-b then sends back a response message to the call receive request message (not shown) and performs a CALL PREPROCESS similar to that performed by the calling terminal (the terminal UE-a) (S08).

After the preprocess ends, at last, the source-side SETUP message is sent from the MSC2 to the terminal UE-b (S09). The SETUP message then arrives at the terminal UE-b through the RNS2 and the CABS2 (which correspond to the destination base stations).

In this process, the RNS2 obtains, from the SETUP message, the ISP-ID added by the RNS1, and checks whether it is the same as the identifier of the ISP that relays between the RNS2 and the CABS2 (which is previously registered in the RNS2: S09A). This is a second feature of the present invention.

When the ISP-IDs are not the same (for example, in FIG. 5, if the terminal UE-b is present under the CABS3, the ISP-ID previously registered in the RNS is "ISP2", and so it does not coincide with the ISP-ID ("ISP1") in the "SETUP"), the RNS2 judges that a direct communication between the CABSs is not possible. In this case, the subsequent calling/answering process is performed in a conventional sequence.

Also, when the SETUP message contains no ISP-ID parameter (e.g., in FIG. 5, if the terminal UE-a is under the BTS2, no ISP-ID is added at the RNS2 to the SETUP message from the terminal UE-a) the RNS judges that inter-CABS direct communication is not possible.

In the sequence of FIG. 6, as well as the RNS1 and the CABS1, the RNS2 and the CABS2 are relayed by the ISP1 (FIG. 5). Therefore the RNS2 judges that the ISP-IDs are the same and that an inter-CABS direct communication is possible.

In this case, when the RNS2 receives a response message "CALL CONFIRM" from the terminal UE-b answering the "SETUP" (S10), the RNS2 enters a novel bearer establish procedure (NEW BEARER SET), which is a third feature of the present invention (S11).

In an existing system, as a conventional bearer establish procedure, the RNS2 would receive the "CALL CONFIRM" and then establish a bearer between the MSC2 and the terminal UE-b. Also, a bearer between the MSC1-MSC2 would be established separately.

In contrast, in the novel bearer establish procedure (S11), no procedure is performed to establish a bearer between the MSC2 and the terminal UE-b and a bearer between the MSC1 and the MSC2. Instead, a procedure is performed to establish a data transmission path directly connecting the CABS1 and the CABS2 using the IP network of the ISP1 (a direct inter-CABS connection) and to establish a radio link bearer between the terminal UE-b and the CABS2.

Specifically, in the novel bearer establish procedure (S11), the RNS2 informs the RNS1 of the IP address of the CABS2. The IP address of the CABS2 arrives at the RNS1 through the MSC2 and the MSC1. Also, the RNS2 informs the CABS2 of the IP address of the CABS1 that it previously obtained from the "SETUP" message. The CABS1 and CABS2 are thus capable of knowing the IP addresses of each other.

The CABS1 and CABS2 then directly communicate with each other using the informed IP addresses of destination CABS and establish a VoIP (Voice over IP) path session as a direct inter-CABS connection (direct inter-CABS bearer).

An important point in the novel bearer establish procedure is the encipher process for ensuring security in radio sections. In the call preprocess, a cipher key is exchanged between the RNS (MSC) and terminal and the RNS-terminal communication is enciphered with the cipher key. Therefore the CABS is unable to decipher the enciphered communication.

Accordingly, at the time when the inter-CABS communication is established, the cipher key is provided to the CABS together with the IP address so that the CABS can decipher the communication. Alternatively, instead of sending the cipher key to the communicating parties, the source-side CABS may decipher the enciphered data and send the deciphered data. Then, only the radio link bearer between the CABS2 and the terminal UE-b is established through an existing procedure. As for the data transmitted on the data transmission path on the IP network, an existing security ensuring technique for IP networks, such as the IPsec, is applicable.

The step <2> of FIG. 7(B) illustrates the image of the bearer establishment described above (the steps shown above the broken line <2> in FIG. 6: S08 to S11). In FIG. 7(B), in addition to the bearers B1, B2 and B3 shown in FIG. 7(A), a data transmission path VS has been established between the CABS1 and the CABS2 and a bearer B4 has been established between the CABS2 and the terminal UE-b.

It should be noted here that the two bearers B2 and VS from the CABS1 are established simultaneously, and at this point of time, the bearer B1 between the terminal UE-a and the CABS1 is connected at the CABS1 to the bearer B2 on the MSC1 side.

After the establishment of the radio bearer B4, the terminal UE-b starts a ringing tone of itself and also sends an ALERT signal to inform the caller side that it is now ringing (S12). The ALERT signal passes through the MSC2 and the MSC1 (S13) to reach the terminal UE-a (S14).

At the same time, a ring tone (usually, RBT [Ring Back Tone]) is sent from the MSC1 to the terminal UE-a through the bearers B3, B2 and B1. This causes the speaker unit (not shown) of the terminal UE-a to generate a ring tone by the RBT. Thus, the CABS1 selects the bearer B2 on the MSC1 side to transfer the RBT from the MSC1 to the terminal UE-a.

When the terminal UE-b responses to the call by off-hook by the user, a CONNECT signal is sent (S15, S16). At the time when the CONNECT signal reaches the MSC1 side, a fourth feature of the present invention, a BEARER CHANGE/DELETE process, is performed (S18).

In the BEARER CHANGE process, the CABS1 changes the bearer selection from the MSC1 side (the bearer B2) to the CABS2 side (the data transmission path VS). At the same time, the bearers B2 and B3 respectively between the CABS1 and the RNS1 and between the RNS1 and the MSC1 are deleted.

Step <3> in FIG. 7(C) shows the image of the bearers settled through the change/delete process (S18). The data transmission bearer directly connecting the CABSs is thus completed between the terminals (the bearer connecting the terminal UE-a, CABS1, CABS2, and terminal UE-b).

Subsequently, the CONNECT signal from the terminal UE-b is sent from the MSC1 to the terminal UE-a (S19). Then, in response to the CONNECT signal (CONNECT ACK transmission) (S17, S20), the communication starts (S21).

A disconnect process from the communicating state (from During Communication) can be realized in a manner similar to an existing one. When a call disconnect request is made by on-hook by either terminal, a disconnect message is exchanged (DISCONNECT PROCESS: S22). This process is performed in an existing manner.

Then, the MSC1 and MSC2 provide bearer release requests (REL REQ (release request)) to their respective subordinates (RNSs) (S23, S24).

In an existing (conventional) system, with the release requests, a process is performed to release the bearers between the terminal UE-a and the CABS1, between the CABS1 and the RNS1, and between the RNS1 and the MSC1. Also, on the side of the terminal UE-b, the bearers are released between the terminal UE-b and the CABS2, between the CABS2 and the RNS2, and between the RNS2 and the MSC2.

However, in the present invention (a fifth feature of the present invention), instead of the conventional bearer release process, processes (BEARER DELETE) are performed to release the bearers between the terminal UE-a and the CABS1 (as in the conventional process), between the CABS1 and the CABS2, and between the CABS2 and the terminal UE-b (S25, S26, S27). All bearers between the terminals are released by these processes.

Subsequently, links for control signals, now unnecessary, are released (S28, S29). These releasing processes are performed in a conventional manner. After the processes of releasing control signal links, the completion of the processes is reported to the MSC1 and the MSC2 (S30, S31). This is the end of the entire sequence from the beginning to the end of the communication between the terminals.

By the way, a plurality of terminals may be subordinate to a base station (CABS). Therefore the procedures shown in FIGS. 5 to 7 are assumed to be performed simultaneously between a plurality of terminals. It is then impossible to distinguish a plurality of communication bearers to the plurality of terminals only with the IP address assigned to the CABS.

The above-mentioned problem can be solved by reporting session numbers indicating individual sessions, in addition to the IP address of the CABS described above. In this case, replacing "IP address" in the operation contents described above with "IP address+session number" suffices.

Then, even when a plurality of terminals are present under a single CABS and they communicate with different terminals, it is possible to perform communication sessions using bearers directly connecting CABSs in the manner described above.

As described so far, using the devices and methods having the five features of the present invention enables the establishment of a direct bearer between CABSs without a need to change existing terminals.

This reduces traffic on the ISP network and traffic on the mobile phone network and allows connections of a larger number of calls.

Furthermore, the ISP-based traffic increases the probability of profits to the ISP and then the resulting reduction of facilities leads to cost reduction, which increases the profits of the mobile phone carrier and thus promotes return of the profits to users, thus offering profits to all three parties, i.e. the carrier, ISP, and users.

Embodiment of the Invention

An embodiment of the present invention is now described.

<Sequence of the Embodiment>

Figure 8:
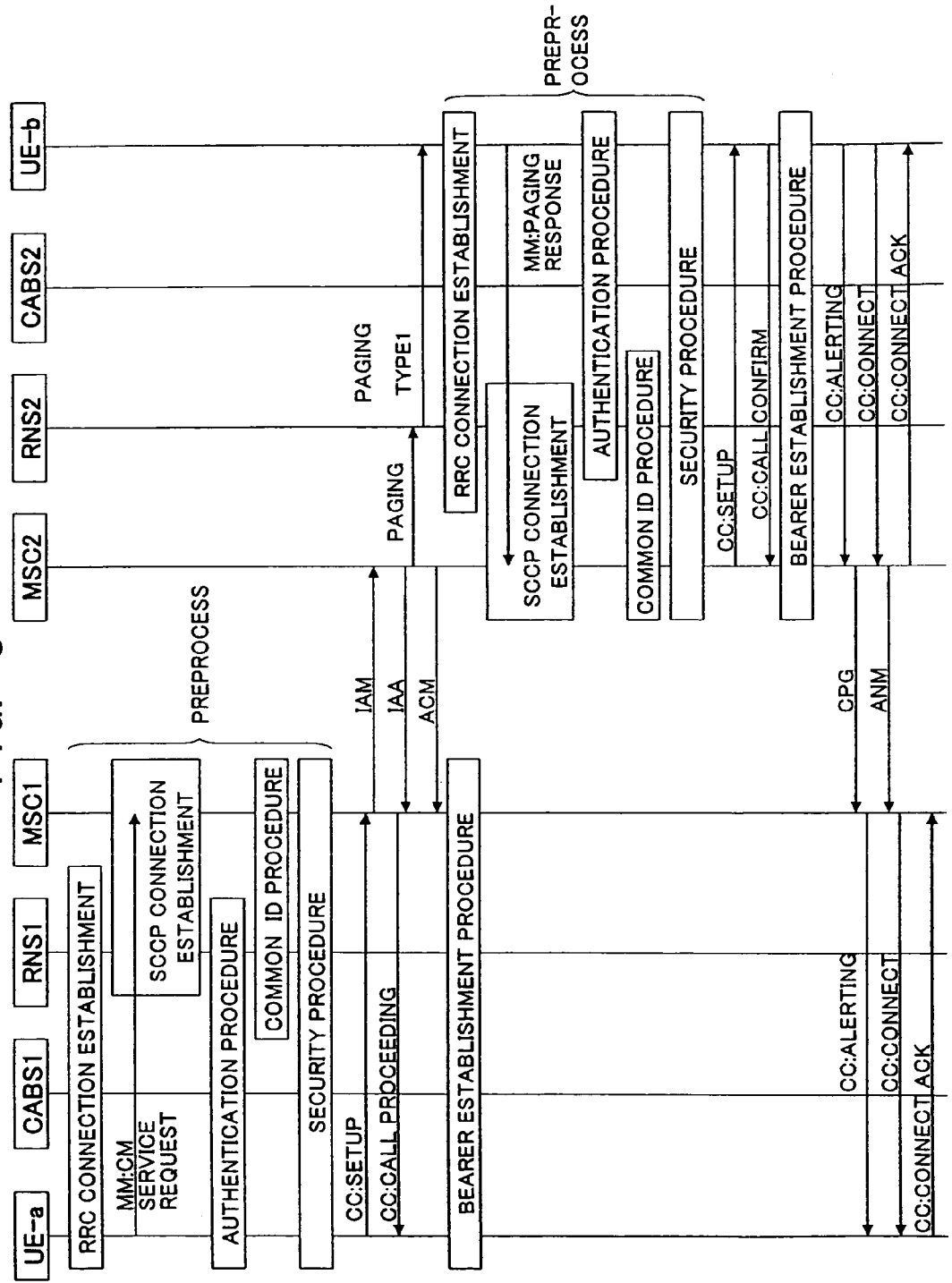
FIG. 8 shows an existing call connection sequence in a 3GNW.

A specific sequence in a third-generation mobile phone network (hereinafter referred to as 3GNW) is now described as an embodiment of the present invention. FIG. 8 shows a sequence from the calling/receiving to the actual communication in an existing 3GNW and FIG. 9 shows a sequence from the calling/receiving to the actual communication according to the present invention.

Figure 9:
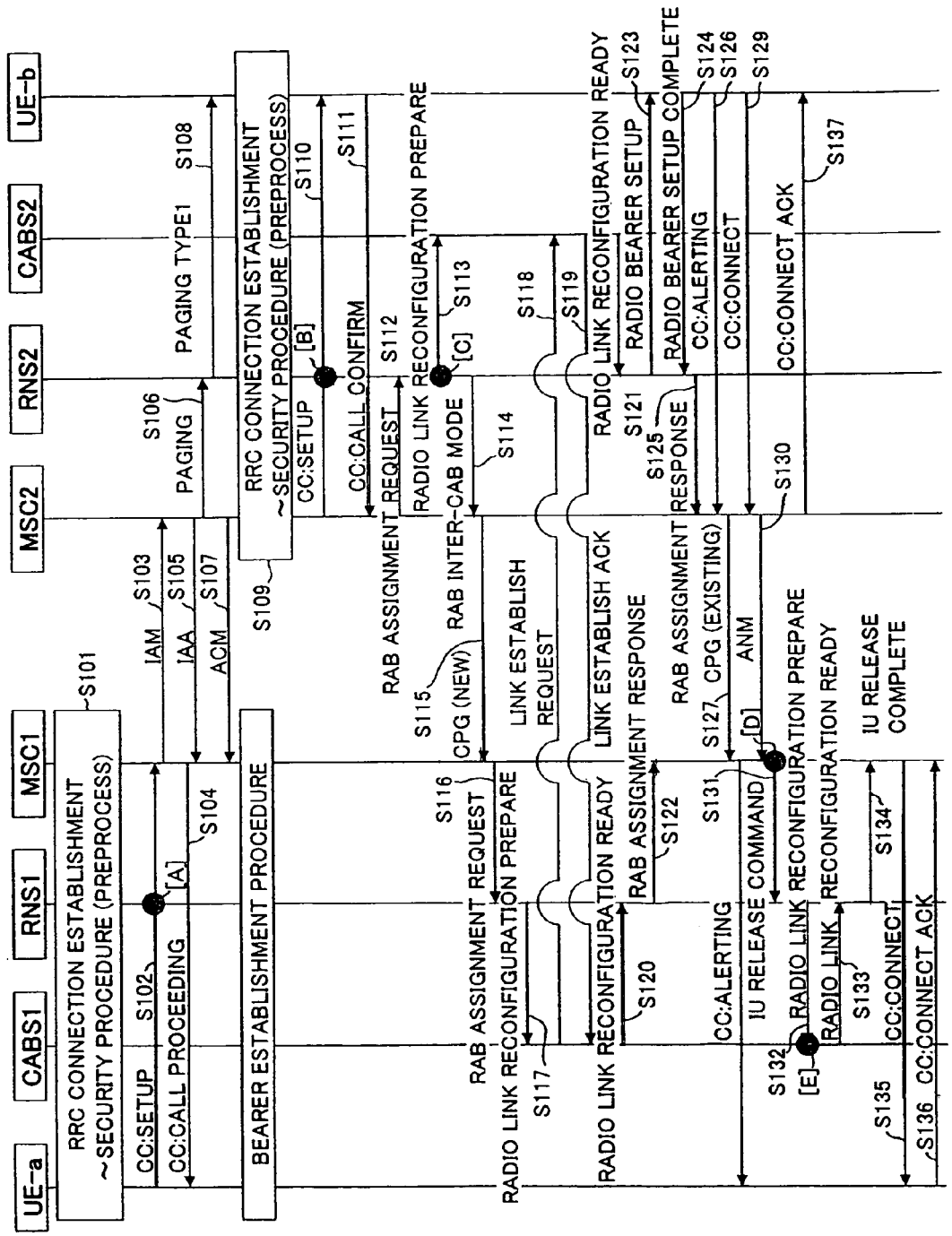
FIG. 9 shows a call connection sequence in a 3GNW according to an embodiment of the present invention.

The sequences of FIGS. 8 and 9 assume the network configuration (topology) shown in FIG. 5 so that the description is consistent with the summarized explanation above.

The process of making a call in the 3GNW is as shown in the first part of FIG. 8 (PREPROCESS), which is in FIG. 9 shown as a single process (see S101). As described in the summary of the present invention, the contents of the preprocess are the same as those of an existing process.

Then, the calling terminal UE-a sends a "CC: SETUP" signal onto the mobile phone network (to the MSC1) according to the CC (Call Control) protocol (3G (IMT-2000) standard-protocol) (S102). In this process, the RNS1 adds the IP address of the CABS1 and the ISP-ID of the ISP1 to the SETUP signal (FIG. 9: [A]).

The MSC1 looks up, from the H/VLR, the LA where the terminal UE-b is present, on the basis of the telephone number of the terminal UE-b contained in the "SETUP," and sends the "SETUP" to the MSC that manages that LA (the MSC2 in this example).

In this process, the "SETUP" from the RNS is sent from the MSC1 to the MSC2 by using a message (IAM: address (Initial Address)) of the ISUP (ISDN (Integrated Service Digital Network) User Part) (S103). The MSC1 also sends to the terminal UE-a a "CALL PROCEEDING" in response to the "SETUP" (S104).

When the MSC2 receives the IAM message, it sends an IAA (address confirmation (IAM acknowledgement)) message to the MSC1 (S105).

When the MSC2 receives the "SETUP", it generates a call receive request PAGING message on the basis of the "SETUP" and sends it to the subordinate RNS (the RNS2 in this example) (S106). The MSC2 also sends an ACM (Address complete) message to the MSC1 (S107).

The RNS2 generates a call receive request PAGING TYPE1 message on the basis of the PAGING message from the MSC2 and sends it to all subordinate base stations (S108). The PAGING TYPE1 message thus arrives at the called terminal UE-b through the CABS2.

The terminal UE-b responds to the PAGING TYPE1 message and then a preprocess as shown in FIG. 8 is performed to establish a radio link (S109). After the preprocess ends, the MSC2 sends the "SETUP" to the terminal UE-b (S110).

The "SETUP" message passes via the RNS2. At this time, the RNS2 obtains the IP address of the CABS1 and the ISP-ID of ISP1 from the "SETUP" and checks the ISP-ID to see whether an inter-CABS bearer can be established (FIG. 9: [B]). In this example, an ISP-ID previously registered in the RNS2 coincides with the ISP-ID obtained from the "SETUP" and therefore the RNS2 judges that a direct inter-CABS bearer can be established (it judges that the two CABSs are connected to the ISP network (IP network)) and decides to establish an inter-CABS bearer.

When the terminal responds to the "SETUP" with a "CALL CONFIRM", the "CALL CONFIRM" is transmitted to the MSC2 (S111). Then, the MSC2 sends to the RNS2 an RAB ASSIGNMENT REQUEST (RANAP (Radio Access Network Application Protocol) protocol), in order to establish a bearer between the MSC2 and the terminal UE-b (S112).

Now, when the RNS2 has decided to establish an inter-CABS bearer, the RNS2 sends a RADIO LINK RECONFIGURATION PREPARE message (S113) to the CABS2, without performing the bearer establishing procedure, thereby informing the CABS2 of the IP address of the CABS1 and instructing the CABS2 to wait for the establishment of a direct VoIP session from the CABS1 (FIG. 9: [C]).

Also, the RNS2 sends an RAB INTER-CAB MODE message (a novel message not defined by the RANAP protocol: an existing message may be used with parameters changed) to the MSC2 to report the IP address of the CABS2 (the RNS2 previously knows the IP address of the CABS2) and to prompt the MSC1 side to start session establishment between the CABS1 and the CABS2 (S114). The MSC2 sends the IP address of the CABS2 and the session establish start instruction to the MSC1 with a CPG (Call Progress) message (novel) (S115).

The IP address of the CABS2 and the session establish start instruction are sent to the RNS1 with an RAB ASSIGNMENT REQUEST message from the MSC1 (S116), and further sent to the CABS1 with a RADIO LINK RECONFIGURATION PREPARE message (S117).

Then, using the IP address of the CABS2, the CABS1 performs a process to establish a VoIP session (specifically, an RTP (Real-time Transport Protocol) session according to the UDP (User Datagram Protocol)). That is, a procedure is performed to establish a direct VoIP session between the CABS1 and the CABS2.

As the VoIP session establish procedure, FIG. 9 shows the transmission of a LINK ESTABLISH REQUEST (session establish request) from the CABS1 to the CABS2 (S118) and the transmission of a LINK ESTABLISH ACK (session establish confirm) from the CABS2 to the CABS1 (S119). A bearer between the CABS1 and CABS2 is thus ensured.

When the inter-CABS bearer is established, the CABS1 and the CABS2 report the bearer establishment respectively to the supervisor RNS1 and RNS2 with RADIO LINK RECONFIGURATION READY messages (S120, S121).

When receiving the RADIO LINK RECONFIGURATION READY message, the RNS1 sends back to the MSC1 an RAB ASSIGNMENT RESPONSE message to respond to the RAB ASSIGNMENT REQUEST message, so as to report the completion of the preparation (S122).

On the other hand, the RNS2 sends to the terminal UE-b a RADIO BEARER SETUP message for establishing a radio bearer with the terminal UE-b that has not been done yet (or originally should be done) (S123).

In response to the RADIO BEARER SETUP message, the terminal UE-b establishes a radio bearer and reports the completion of the radio bearer establishment with a RADIO BEARER SETUP COMPLETE message (S124).

The RNS2 receives the RADIO BEARER SETUP COMPLETE message and then sends an RAB ASSIGNMENT RESPONSE message to the MSC2 to report the completion of preparation (S125).

Having established the radio bearer, the terminal UE-b sends a CC:ALERTING message (S126). At the same time, the terminal UE-b starts a ringing tone thereof to inform the user of the incoming call.

The ALERTING message passes via the MSC2 and MSC1 (S127: carried by a CPG message (existing)) to reach the terminal UE-a (S128). Also, with the transmission of the ALERTING message, the MSC1 sends an RBT to the terminal UE-a (not shown). The user of the terminal UE-a can hear the RBT.

Subsequently, when the user of the terminal UE-b makes off-hook (i.e. responds), a CC: CONNECT message is sent (S129). The CONNECT message is transferred to the MSC1 via the MSC2 (S130: ANM (Answer: response)). Then, the bearer change/delete process is started (FIG. 9: [D]).

That is, the MSC1 sends an IU RELEASE COMMAND to the RNS1 to command that the bearer between the RNS1 and the MSC1 be deleted and that the bearer between the RNS1 and CABS1 be deleted and switched to the bearer between the CABS1 and the CABS2 (S131).

The RNS1 reports to the CABS 1 about the bearer delete and change instruction with a RADIO LINK RECONFIGURATION PREPARE message (S132). According to the RADIO LINK RECONFIGURATION PREPARE message, the CABS1 performs processing to change from the bearer on the MSC1 side to the bearer between the CABS1 and the CABS2. Subsequently, the CABS1 disconnects the bearer to the RNS1 (FIG. 9: [E]).

Then, the CABS1 reports the completion of the bearer change and deletion to the RNS1 with a RADIO LINK RECONFIGURATION READY message (S133). Accordingly, the RNS1 disconnects the bearer between the RNS1 and the MSC1 and reports the completion of the bearer change and disconnection to the MSC1 with an IU RELEASE COMPLETE message (S134).

Subsequently, the CC: CONNECT message is sent from the MSC1 to the terminal UE-a (S135) and the call connection is completed. A "CONNECT ACK" to the "CONNECT" is sent back respectively to the MSC1 and the terminal UE-b (S136, S137).

In the sequence of FIG. 9, the process steps S112 to S125 correspond to the new bearer setup (S11) shown in the summary of FIG. 6. The process steps S131 to S134 correspond to the bearer change/delete process (S18) of FIG. 6.

The messages shown in FIG. 9 are examples, and particularly in the new sequence parts, any messages can be used when agreements are made using parameters etc. This embodiment does not intend to restrict the message types used to perform the sequence. Also, the session establishment between the CABS1 and the CABS2 has been shown by way of example and the inter-CABS bearer establishment of the present invention is not limited to the embodiment.

Also, the sequence of FIG. 9 may be configured so that the RNS2 directly informs the CABS1 of the IP address of the CABS2 through the IP network by using the IP address of the CABS1. Alternatively, when the CABS2 receives the IP address of the CABS1 from the RNS2, the CABS2 may report the IP address of the CABS2 directly to the CABS1 using the IP address of the CABS1.

Figure 10:
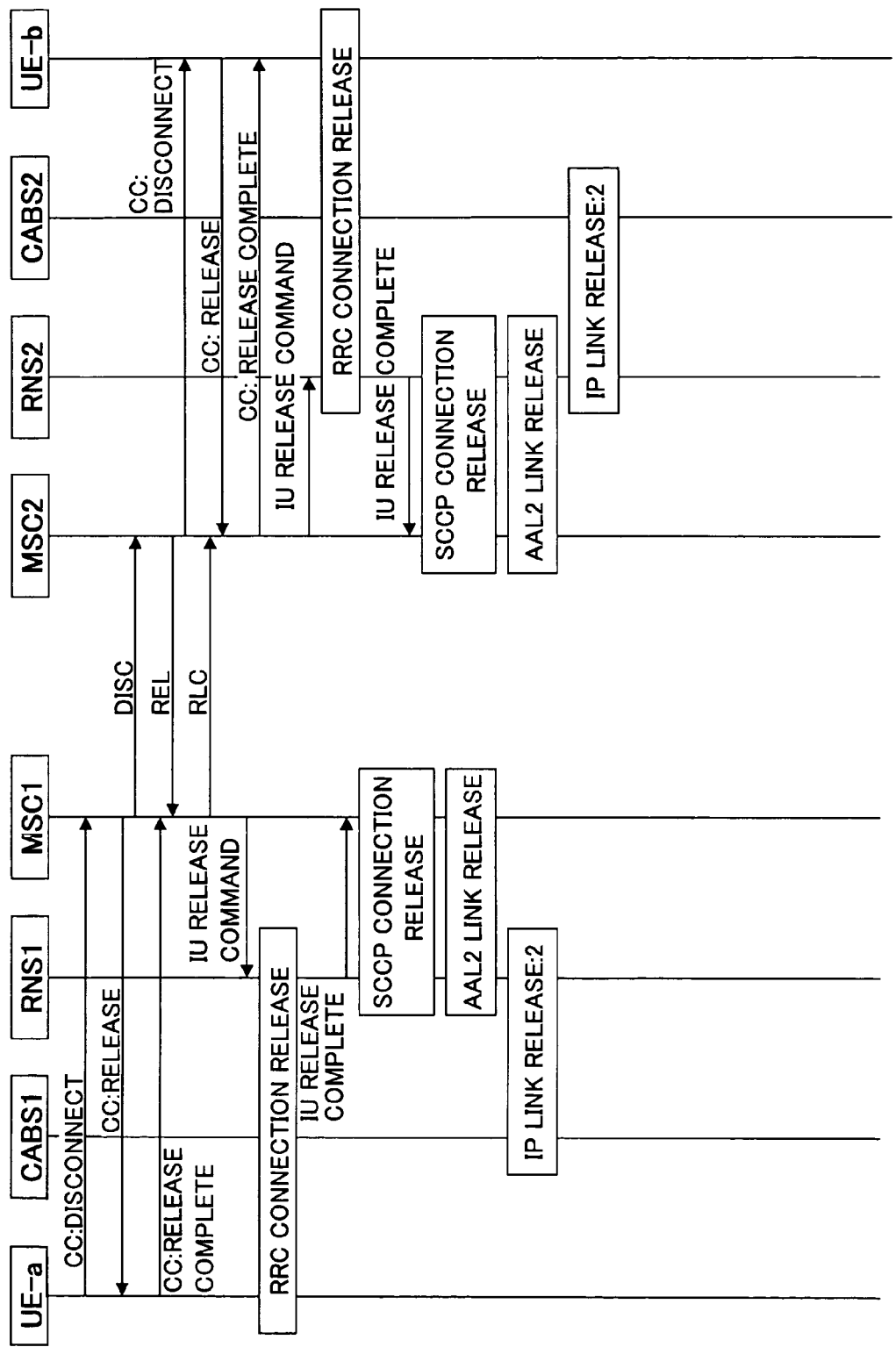
FIG. 10 shows an existing disconnection sequence in a 3GNW.
Figure 11:
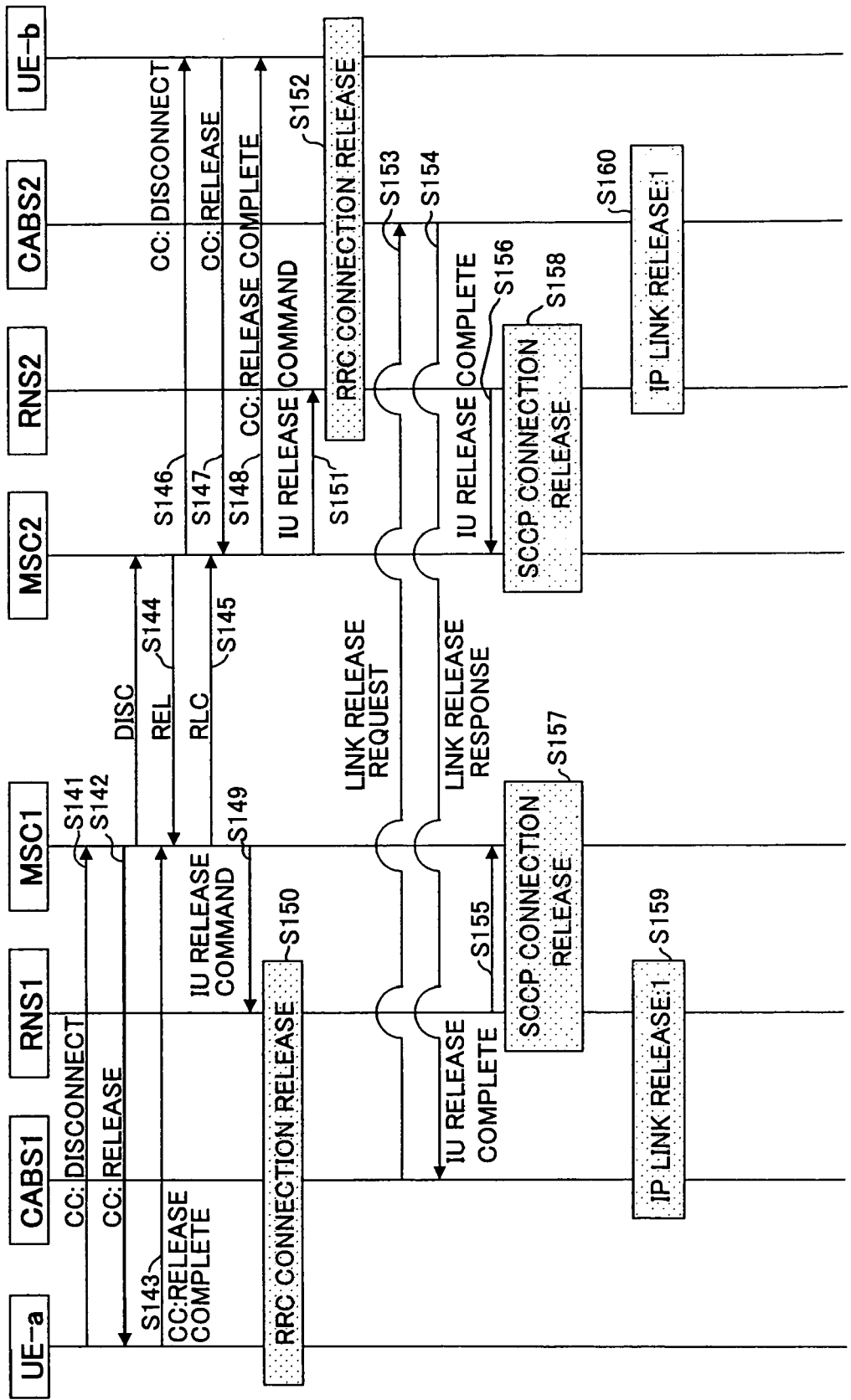
FIG. 11 shows a disconnection sequence in a 3GNW according to the embodiment of the present invention.

FIG. 10 is a diagram showing an existing disconnection sequence in a 3GNW, and FIG. 11 is a diagram showing the disconnection sequence in the 3GNW of the embodiment of the present invention.

As shown in FIG. 11, when the terminal UE-a, for example, makes on-hook, the terminal UE-a sends a CC: DISCONNECT message to the MSC1 (S141). The MSC1 sends a CC: RELEASE message to the terminal UE-a (S142). The terminal UE-a responds to the CC: RELEASE message with a CC: RELEASE COMPLETE message (S143).

Also, the MSC2 sends a REL (Release) message to the MSC1 (S144). The MSC1 responds to the MSC2 with an RLC (Release Complete) (S145). Further, the MSC2 sends a CC: DISCONNECT message to the terminal UE-b (S146). In response, the terminal UE-b sends a CC: RELEASE message to the MSC2 (S147). The MSC2 responds to the CC: RELEASE message with a CC: RELEASE COMPLETE message (S148).

Subsequently, the MSC1 instructs the RNS1 to disconnect the bearer with an IU RELEASE COMMAND message (S149). In response, the RNS1 performs an RRC Connection Release process to disconnect the radio link between the terminal UE-a and the CABS1 (S150).

Similarly, the MSC2 instructs the RNS2 to disconnect the bearer with an IU RELEASE COMMAND message (S151). In response, the RNS2 performs an RRC Connection Release process to disconnect the radio link between the terminal UE-b and the CABS2 (S152).

These process steps S141 to S152 are the same as existing process steps (see FIG. 10). However, in the sequence of the embodiment shown in FIG. 11, the CABS1 and the CABS2 respectively confirm the RRC Connection Release instructions, and release the VoIP session between the CABS1 and the CABS2 (S153, S154). This is a feature of the present invention.

The bearer release process is completed when the bearer between the CABS1 and the CABS2 is released. Then, the RNS1 and the RNS2 report the bearer release completion respectively to the MSC1 and the MSC2 with an IU RELEASE COMPLETE message (S155, S156).

Subsequently, in the existing system (FIG. 10) processes of disconnecting bearers and control links between the CABS-RNS and between RNS-MSC are performed. In contrast, in the embodiment of the present invention, there are no bearers between CABS-RNS and between RNS-MSC. Therefore, only the processes of disconnecting control links between RNS-MSC and RNS-CABS are performed (S157, S158, S159, S160).

Accordingly, as shown in FIG. 10, the existing system requires two link release processes by AAL2 LINK Release and SCCP Connection Release between MSC-RNS, and two IP LINK Releases between CABS and RNS. In contrast, the embodiment of FIG. 11 only requires the release process by the SCCP Connection Release and a single IP LINK Release.

The process steps S150, S153, and S154 shown in FIG. 11 correspond to the bearer delete process (S25) shown in the outlines of FIG. 6.

<Configuration of CABS>

Figure 12:
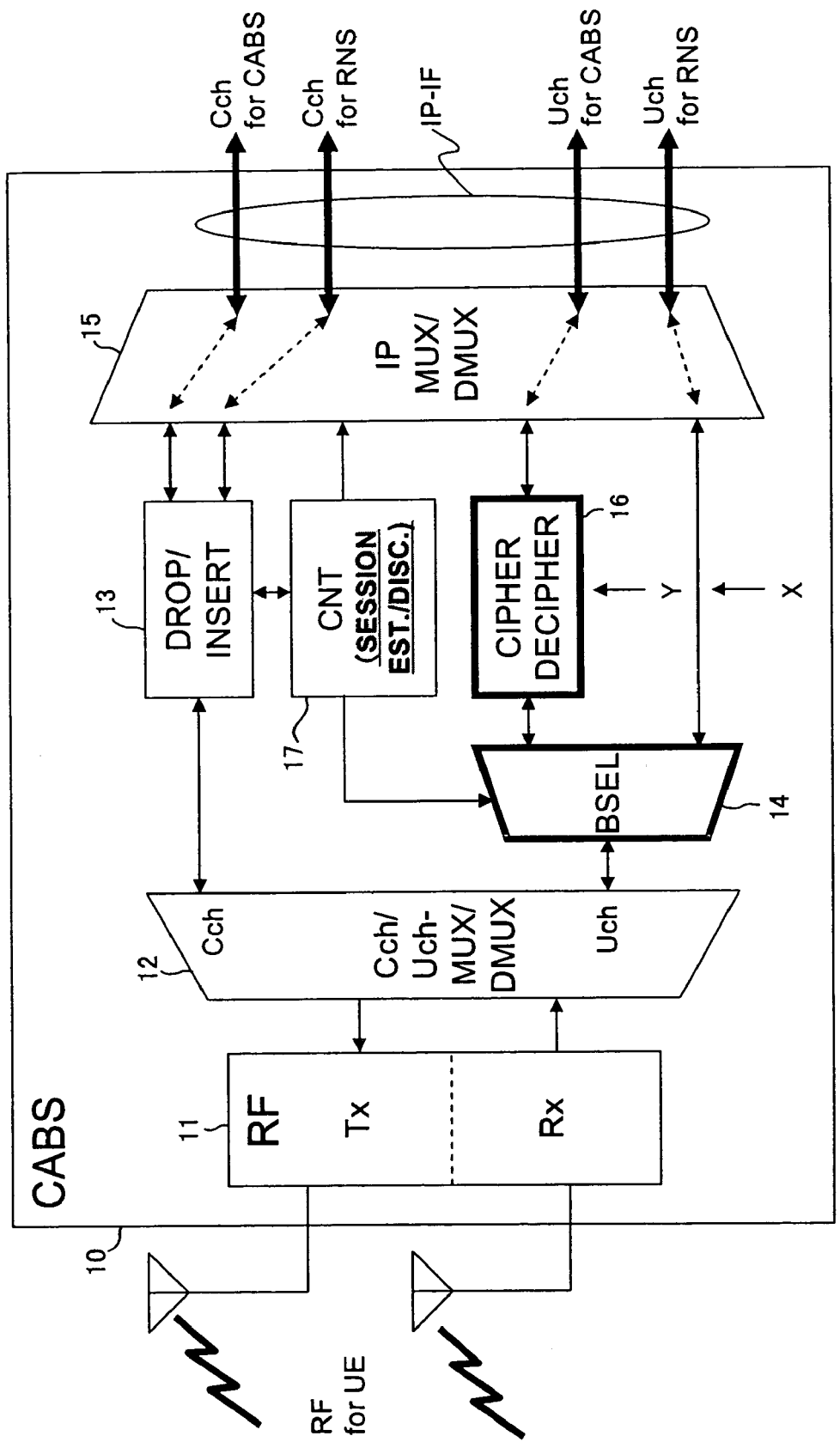
FIG. 12 is a block diagram showing a configuration example of a CABS according to the embodiment of the present invention.

FIG. 12 is a functional block diagram of a CABS 10 (an embodiment of the CABS) in an implementation of the present invention. In FIG. 12, the CABS 10 includes a radio interface unit (RF) 11, a multiplex/demultiplex unit (Cch/Uch-Mux/Dmux) 12 connected to the RF 11, a Drop/Insert unit 13 connected to the Cch/Uch-Mux/Dmux unit 12 through a control channel (Cch), and a bearer selector (Bsel) 14 connected to the Cch/Uch-Mux/Dmux unit 12 through a user channel (Uch).

The CABS 10 further includes an IP multiplex/demultiplex unit (IP Mux/Dmux) 15 connected to the bearer selector 14 through user channels and connected to the Drop/Insert unit 13 through control channels, Cipher Decipher unit 16 provided on a user channel between the IP Mux/Dmux unit 15 and the bearer selector 14, and a control unit (CNT unit (including a session establish/disconnect unit (Session est./disc.))) 17 connected to the Drop/Insert unit 13 and for controlling the bearer selector 14 and the IP Mux/Dmux unit 15.

The RF 11 has a transmit unit (Tx) connected to a transmit antenna and a receive unit (Rx) connected to a receive antenna. The RF 11 performs communication with terminals. Data from a terminal is received at the receive unit of the RF 11 and inputted to the Cch/Uch-Mux/Dmux unit 12.

The Cch/Uch-Mux/Dmux unit 12 assigns input of control data to the control channel and assigns user data to the user channel. The control data is inputted to the Drop/Insert unit 13, and the user data is inputted to the bearer selector 14.

The control data from the Cch/Uch-Mux/Dmux unit 12 passes via the Drop/Insert unit 13 and IP-packetized in the IP Mux/Dmux unit 15. The packetized data is usually sent to the RNS supervising the CABS 10.

Conversely, a control data packet from the RNS (control data to be sent to a terminal) is separated in the IP Mux/Dmux unit 15 and passed via the Drop/Insert unit 13. Then, the data is passed from the Cch/Uch-Mux/Dmux unit 12 to the transmit unit of the RF 11 and sent by radio to the terminal.

On the other hand, control data exchanged between RNS-CABS is provided from the IP Mux/Dmux unit 15 to the Drop/Insert unit 13 and then captured (dropped) in the CNT unit 17 and terminate-processed in the CNT unit 17.

The CNT unit 17 generates control data to be sent to the RNS, which is inserted in the Drop/Insert unit 13. The control data is sent to the RNS from the IP Mux/Dmux unit 15 through the control channel.

On the other hand, user data from a terminal is assigned to the user channel in the Cch/Uch-Mux/Dmux unit 12, and given to the bearer selector 14.

Between the bearer selector 14 and the IP Mux/Dmux unit 15, there are a first route X on which user data does not pass through the Cipher Decipher unit 16 and a second route Y on which user data passes through the Cipher Decipher unit 16.

When a user bearer passes through the mobile phone network (via RNS-MSC), the user data is outputted from the bearer selector 14 onto the first route X and inputted to the IP Mux/Dmux unit 15 without being enciphered, which is IP packetized and sent out onto the user channel to the RNS.

Meanwhile, the IP Mux/Dmux unit 15 assigns user data from the RNS to the first route X. Then, the user data passes through the bearer selector 14 and the Cch/Uch-Mux/Dmux unit 12, and sent by radio to the terminal from the transmit unit of the RF 11.

On the other hand, when inter-CABS communication is performed, user data from the terminal is assigned to the user channel side and then inputted to the bearer selector 14. The bearer selector 14 then outputs the user data onto the second route Y.

The user data thus passes the Cipher Decipher unit 16. The Cipher Decipher unit 16 deciphers the user data that was enciphered at the terminal. This is because the correspondence CABS is unable to release the cipher applied to the user data. Then, the deciphered user data is IP packetized in the IP Mux/Dmux unit 15, and sent to the correspondence CABS through the established inter-CABS session.

Also, data from the correspondence CABS is assigned from the IP Mux/Dmux unit 15 to the second route Y, enciphered in the Cipher Decipher unit 16, passed through the bearer selector 14 and the Cch/Uch-Mux/Dmux unit 12, and sent to the terminal from the RF unit 11.

The CNT unit 17 processes inter-CABS session (processes of establishing and disconnecting a session), and control data for establishing a session is all terminated in the CNT unit 17 and communication is performed with the control unit (CNT unit) of the correspondence CABS through the IP Mux/Dmux unit 15.

The CNT unit 17 controls the route selection by the bearer selector 14. That is, when an inter-CABS session is established, the CNT unit 17 provides the bearer selector 14 with a control signal for selecting the second route Y. On the other hand, when inter-CABS session is not established, the CNT unit 17 provides the bearer selector 14 with a control signal for selecting the first route X.

Now, it should be noted that the four control and user channels shown in the right part of FIG. 12 are logical links and they are physically multiplexed on a single IP interface (IP-IF) It is also an important function that these logical links are capable of simultaneous holding.

As shown above, the CABS 10 has, in addition to common base station functions, a function of separating the user channel data route into the first route X and the second route Y to effect cipher/decipher when needed. The CABS 10 also has a function of switching the data route on the basis of signals from the control channels. Moreover, the CABS 10 has a function of establishing/disconnecting sessions between CABSs. The application of the CABS 10 enables the sequences shown in FIG. 9 and FIG. 11.

In the CABS 10 shown in FIG. 12, the RF 11 corresponds to a receiving unit of the present invention, the IP Mux/Dmux unit 15 corresponds to a sending unit of the present invention, and the CNT unit 17 corresponds to a data transmission path establish/disconnect unit of the present invention. The CNT unit 17 functions also as a data communication path establish/disconnect unit, a switching control unit, and a connection control unit of the present invention. The bearer selector 14 functions as a switching unit and a connection unit of the present invention.

<Process Performed by RNS>

Figure 13:
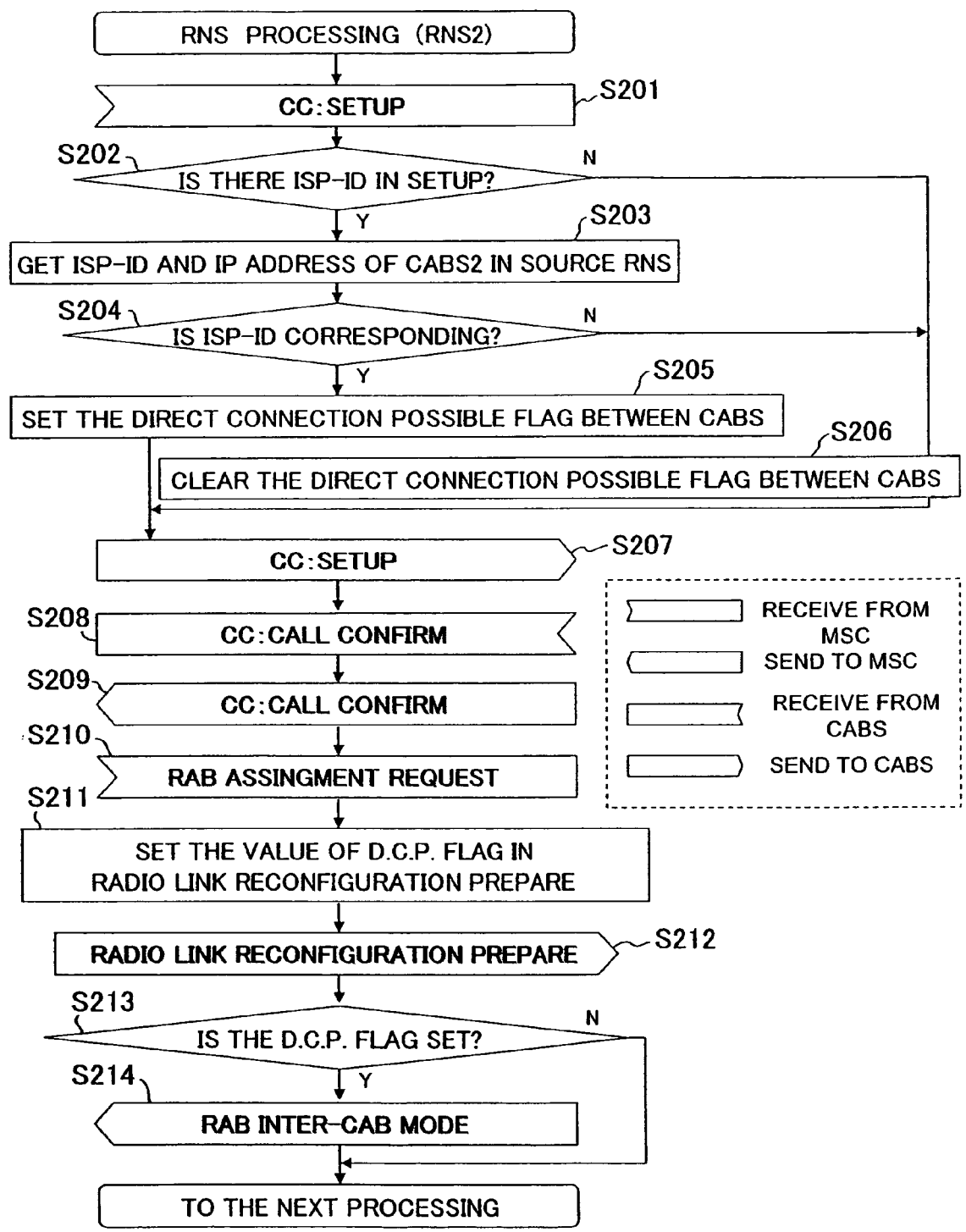
FIG. 13 is a flowchart of a process performed by a destination RNS (D-RNS) according to the embodiment of the present invention.

FIG. 13 is a flowchart of a process performed by a destination base station control device (RNS) of the present invention, which shows process steps related to a change from existing RNS device. The process of FIG. 13 is started when the SETUP signal from the calling party is received at the called party's RNS (destination RNS: D-RNS). In the sequence of FIG. 9, the RNS2 corresponds to the destination RNS side.

When receiving a SETUP signal (S201: CC SETUP), the RNS2 checks whether the SETUP signal contains an ISP-ID (S202: Is there ISP-ID in STUP).

When an ISP-ID is present (S202:Y), the RNS2 obtains the ISP-ID previously stored on a storage in the RNS2 and the IP address of the CABS2 (S203: Get ISP-ID and IP address of CABS2 in source RNS) and checks whether the ISP-IDs coincide with each other (S204: Is ISP-ID corresponding?).

When the ISP-IDs coincide (S204;Y), the RNS2 judges that an inter-CABS direct communication is possible, and sets (ON) a Direct Connection Possible flag (D.C.P flag) (S205: Set the Direct Connection Possible flag between CABSs).

When there is no ISP-ID (S202: N), or when the ISP-IDs do not coincide with each other (S204: N), the RNS2 clears (sets off) the D.C.P flag (S206: Clear the Direct Connection Possible flag between CABSs).

When finishing the step S205 or S206, the RNS2 sends the received "SETUP" to the CABS2 (S207). These process steps S201 to S207 correspond to the internal processing shown at [B] in FIG. 9.

Subsequently, when receiving the "CALL CONFIRM" from the CABS2 side (S208), the RNS2 sends the "CALL CONFIRM" to the MSC2 (S209).

Next, the RNS2 receives a bearer establish instruction from the MSC2 with a "RAB ASSIGNMENT REQUEST" (S210). Then, the RNS2 sets the D.C.P flag value, which was determined in S205 or S206, in a "RADIO LINK RECONFIGURATION PREPARE" (S211), and sends it to the CABS2 (S212). The process steps S210 to S212 correspond to the internal processing shown at [C] in FIG. 9.

Then, the RNS2 checks whether the D.C.P. flag is set or not (S213). When the D.C.P. flag is set (ON) (S213: Y), the RNS2 sends an RAB INTER-CAB MODE (a novel message) carrying the destination CABS (the IP address of the CABS2) (S214), to prompt the source side to perform an inter-CABS direct link establish process. These process steps implement the sequence of S110 to S114 of FIG. 9.

<Process Performed by MSC>

FIG. 14 is a flowchart of a process which the switch (MSC) of the present invention performs when receiving a CPG message, which shows process steps related to differences from an existing process.

As shown in FIG. 9, the embodiment of the present invention uses two kinds of messages, including the novel CPG message sent in S115 of FIG. 9 and the existing CPG message sent in S127. The existing CPG message means an ALERTING message. On the other hand, the novel CPG message is a message indicating the "RAB INTER-CAB MODE."

The MSC can tell (distinguish) whether the CPG message is the existing message or the novel message (the CPG message type) by referring to a parameter set in the CPG message.

In FIG. 14, when the MSC (MSC1 in FIG. 9) receives a CPG message (S301), the MSC refers to a given parameter in the CPG message to judge whether the CPG message is the novel message (S302).

When the CPG message is the existing CBG message (S302: N), the MSC sends an ALERTING message to the RNS (RNS1) in a conventional manner (S308) and proceeds to the next step.

On the other hand, when the CPG message is the novel CPG message (S302: Y), the MSC obtains the IP address of the destination CABS (CABS2) from the CPG message (S303: Get IP address of CABS2 from CPG (NEW)).

Here, the novel CPG message is a message for sending RAB INTER-CAB MODE including the IP address of the destination CABS, and therefore the novel CPG message contains the IP address of the destination CABS. The IP address is obtained in the step S303.

Next, the MSC sets the obtained IP address of the destination CABS in the RAB ASSIGNMENT REQUEST message for requesting inter-CABS link establishment (S304: Set IP address of CABS2 in RAB ASSIGNMENT REQUEST) and sends the message to the RNS (S305: see S116 in FIG. 9). Thus, the inter-CABS link establish process shown in FIG. 9 is performed (S118, S119).

When devices subordinate to the MSC complete the inter-CABS link establish process, an RAB ASSIGNMENT RESPONSE message is sent to the MSC (see S122 in FIG. 9). The MSC receives the RAB ASSIGNMENT RESPONSE message (S306). Then, the MSC sets an internal flag indicating that this call has entered the inter-CABS direct communication mode (S307: Set INTER-Cab mode about this call) The MSC then proceeds to the next step.

FIG. 15 is a flowchart of a process performed by the MSC in the embodiment, which is a process performed when the ANM message (see S130 of FIG. 9) is received. When the MSC receives an ANM message (S401), the MSC checks the internal flag value about this call to see whether the value of the internal flag (described in S307 of FIG. 14) indicates the INTER-CAB MODE, i.e., inter-CABS direct communication mode (S402).

When the internal flag indicates the INTER-CAB MODE (when the internal flag was set in S307: S402; Y), the MSC sends the IU RELEASE COMMAND message to the RNS to delete the bearer previously established between the RNS and MSC (S403: see S131 of FIG. 9).

With the transmission of the IU RELEASE COMMAND, the RNS and CABS delete the bearers between CABS (CABS1)-RNS(RNS1) and between RNS(RNS1)-MSC (MSC1) (see S132, S133 in FIG. 9).

Next, the MSC receives the IU RELEASE COMPLETE message that is sent from the RNS when the bearer deletion ends (S404). Subsequently, the MSC sends the CC:CONNECT message to the RNS (RNS1) (S405), as it does when receiving an existing ANM message.

In the step S402, when it is judged that INTER-CAB MODE is not set (S402: N), the process proceeds to S405. That is, the process is conducted in a conventional manner.

Figure 16:
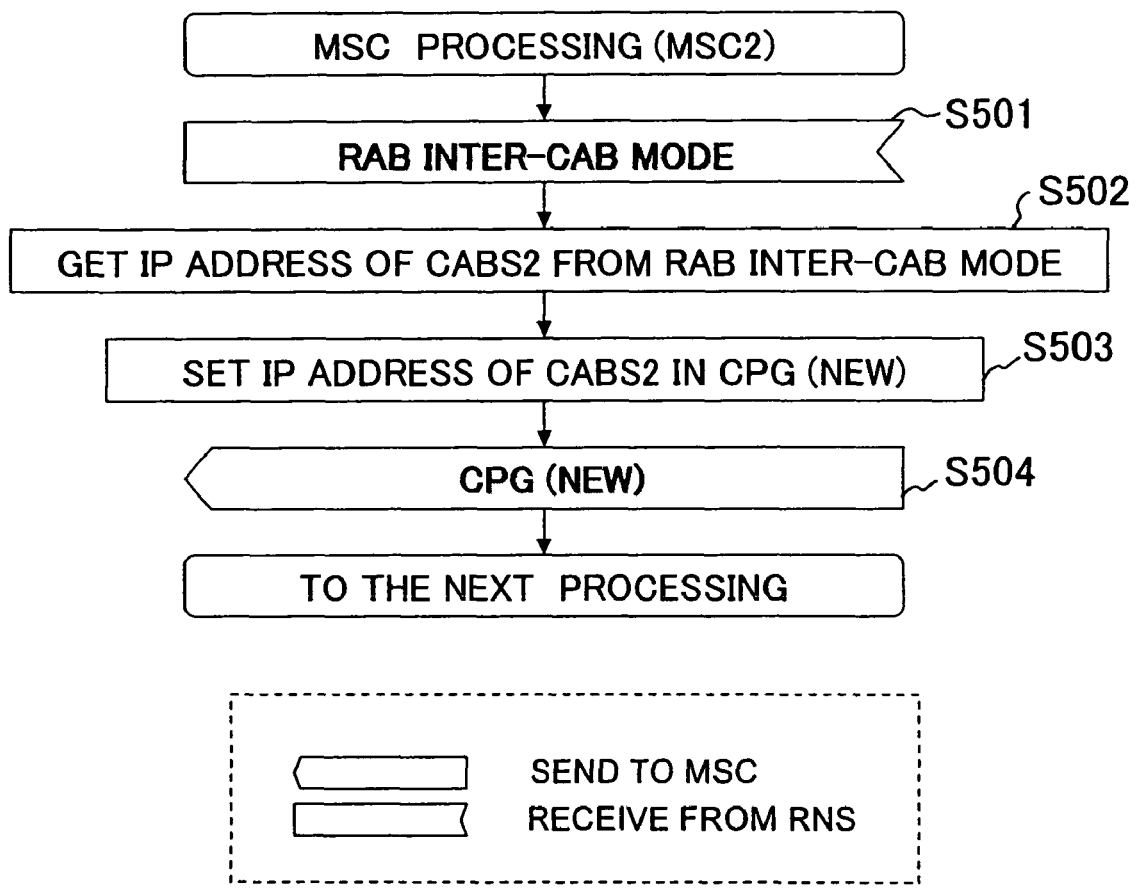
FIG. 16 is a flowchart of a process performed by a destination MSC (D-MSC) according to the embodiment of the present invention.

FIG. 16 is a flowchart of a process performed by the MSC in the embodiment, which shows internal processing that the MSC (in FIG. 9, the MSC2) performs when receiving the novel RAB INTER-CAB MODE message from the RNS (S114 of FIG. 9).

In FIG. 16, the MSC2 receives the RAB INTER-CAB MODE message (S501) and then obtains the IP address of the CABS2 from the RAB INTER-CAB MODE message (S502: Get IP address of CABS2 from RAB INTER-CAB MODE).

Next, the MSC2 sets the obtained IP address in the novel CPG message as one of parameters of the novel CPG message (S503: Set IP address of CABS2 in CPG (NEW)). Then, the MSC2 sends the novel CPG message to the source MSC (MSC1) (S504). The novel CPG message is received at the source MSC (MSC1) and the process of the flowchart of FIG. 14 follows.

<Process Performed by CABS>

Figure 17:
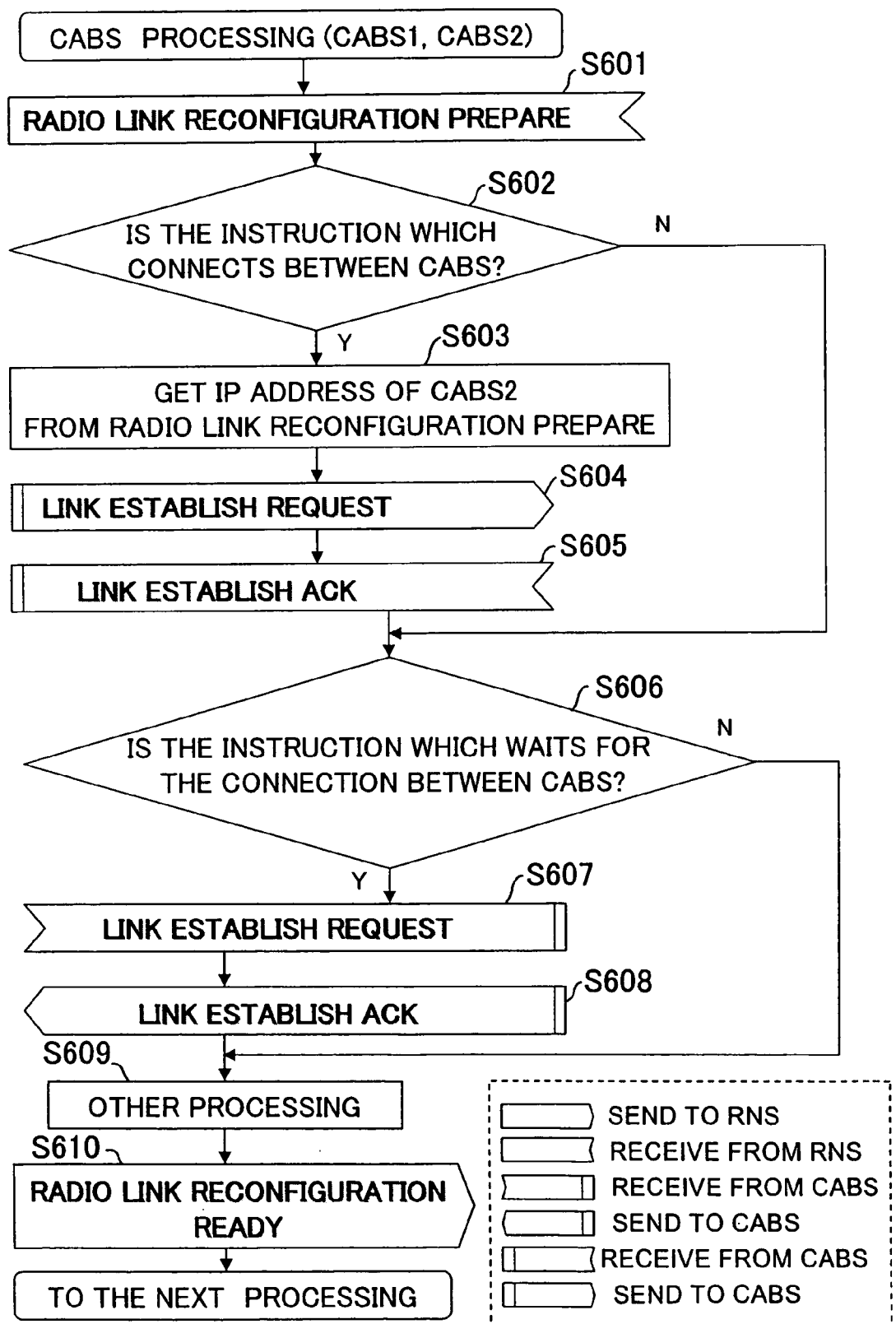
FIG. 17 is a flowchart of a process performed by a source CABS (S-CABS) and a destination (D-CABS) according to the embodiment of the present invention.

FIG. 17 is a flowchart of a process performed by a radio base station device (CABS) according to the embodiment of the present invention, which shows process steps related to differences from an existing process about bearers. The process of FIG. 17 is applied to both of the source CABS of FIG. 9 (S-CABS: the CABS1 in FIG. 9) and the destination CABS (D-CABS: the CABS2 in FIG. 9).

The CABS1 receives the RADIO LINK RECONFIGURATION PREPARE message from the RNS1 (S601) and checks whether the message indicates inter-CABS direct connection (S602: Is the instruction for connection between CABSs).

Now, the RNS1 has received the RAB ASSIGNMENT REQUEST message from the MSC1 (FIG. 9: S116). The message contains the IP address of the CABS2 set by the MSC1 (FIG. 14: S304, S305). The RNS1 generates the RADIO LINK RECONFIGURATION PREPARE message with the IP address of the CABS2 contained therein and sends the message to the CABS1 (S117 of FIG. 9).

The CABS1 receives the RADIO LINK RECONFIGURATION PREPARE message in the step S601. The CABS1 can judge (recognize) that the message indicates inter-CABS direct connection by referring to the message and detecting from the message a parameter indicating inter-CABS direct connection (e.g., a flag: set by the RNS1).

When the CABS1 judges that the RADIO LINK RECONFIGURATION PREPARE message indicates inter-CABS direct connection, the CABS1 obtains the IP address of the CABS2 contained in the message (S603: Get IP address of CABS2 from RADIO LINK RECONFIGURATION PREPARE).

Next, the CABS1 sends the LINK ESTABLISH REQUEST message to the CABS2 at the obtained IP address of the CABS2 through the IP network to request an inter-CABS direct connection (direct link establishment) (S604).

Then, the CABS1 receives the LINK ESTABLISH ACK message from the CABS2 indicating an OK (approval) of the direct link establishment (S605), and performs a process that should be originally performed for the RADIO LINK RECONFIGURATION PREPARE message (shown in the flowchart as "Other Processing") (S609).

That is, when receiving the LINK ESTABLISH ACK message in the step S605, the CABS1 selects "NO" in the next step S606 and continues the process to S610. Then, the CABS1 sends back the RADIO LINK RECONFIGURATION READY to the RNS to report the completion of the process (S610).

On the other hand, the CABS2 also receives the RADIO LINK RECONFIGURATION PREPARE message from the RNS2 (see S113 of FIG. 9) (S601). The RADIO LINK RECONFIGURATION PREPARE message contains the D.C.P. flag value (on or off) set in the step S211 in FIG. 13. However, the message does not contain such an inter-CABS direct connection instruction as is detected in the step S602.

Therefore, the CABS2 makes a decision "NO" in the step S602 about the received message and proceeds to S606. In the step S606, the CABS2 checks whether the D.C.P. flag value is on or off. The CABS2 thus judges whether there is an instruction to wait for inter-CABS connection (the LINK ESTABLISH REQUEST message from the CABS1) (S606: Is the instruction to wait for the connection between CABSs?)

Now, when the D.C.P flag value is on, the CABS2 decides that there is a wait instruction, and when the D.C.P. flag value is off, it decides that there is no wait instruction. With no wait instruction (S606: N), the CABS2 proceeds to the step S609.

On the other hand, when a wait instruction is present (S606: Y), the CABS2 waits for the LINK ESTABLISH REQUEST message from the CABS1, and when receiving the message (S607), the CABS2 performs a link (session) establish process between the CABS1 and CABS2 and sends the LINK ESTABLISH ACK message to the CABS1 (S608). After that, the CABS2 proceeds to S609 to perform other processing and sends back the RADIO LINK RECONFIGURATION READY to the RNS2 to report the completion of the process (S10).

When the CABS1 or CABS2 receives a RADIO LINK RECONFIGURATION PREPARE message that contains neither link establish instruction nor wait instruction, it skips S603-S605, S607, S608 and performs only S609 and S610.

The process shown in FIG. 17 is performed in the CNT unit 17 of the CABS 10 shown in FIG. 12. In the CABS, the process shown in FIG. 17 may be realized as a software process in which a processor executes a given control program stored in memory, or the process may be realized as a hardware process using a hardware chip.

<Configuration of RNS>

Figure 18:
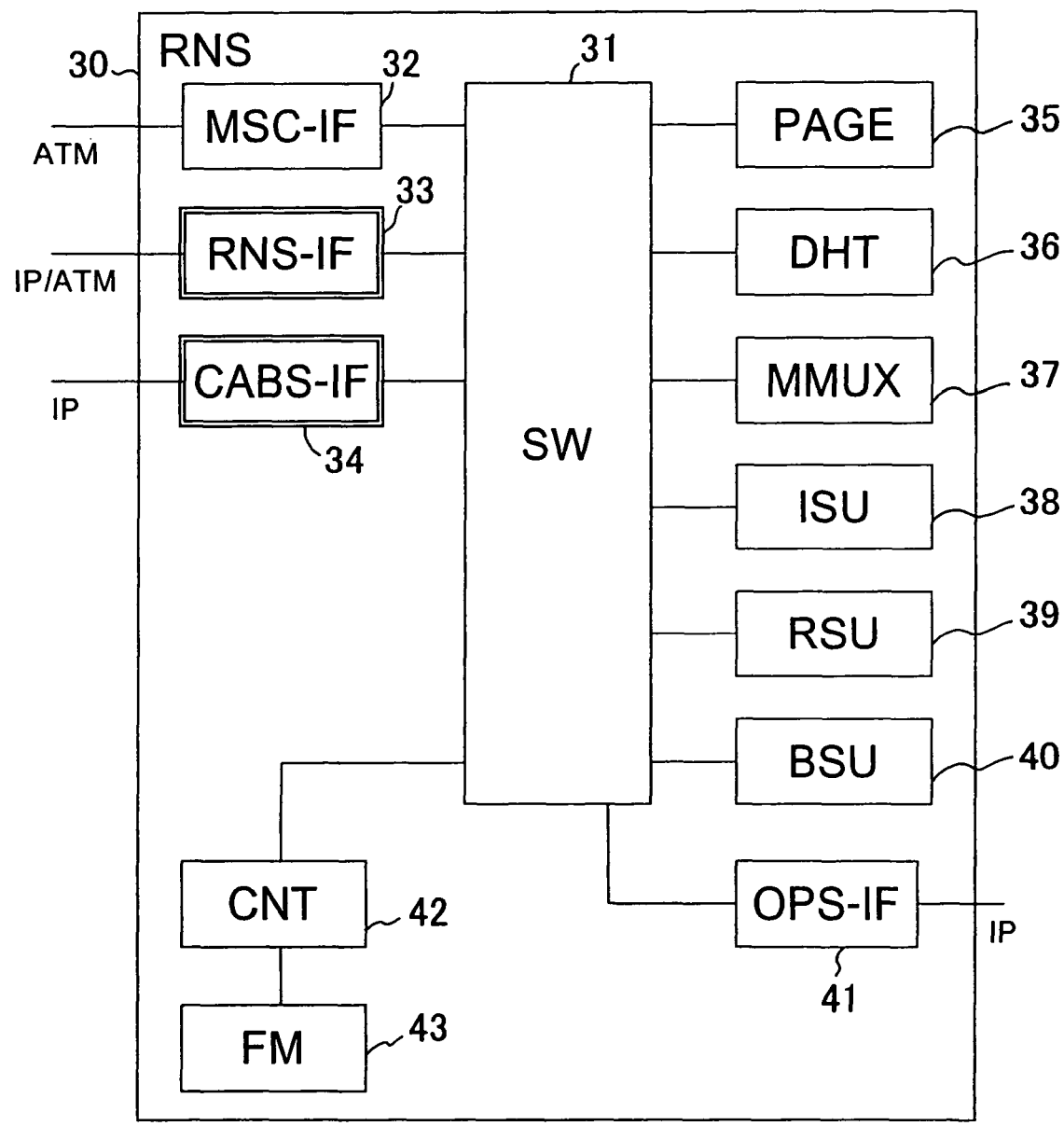
FIG. 18 is a block diagram showing a configuration example of the RNS according to the embodiment of the present invention.

FIG. 18 is a diagram showing a configuration example of the base station control device (RNS) according to the embodiment of the present invention. In FIG. 18, an RNS 30 includes a switch (SW) 31, an MSC-IF 32 connected to the switch 31, an RNS-IF 33, a CABS-IF 34, a PAGE 35, a DHT 36, an MMUX 37, an ISU 38, an RSU 39, a BSU 40, an OPS-IF 41, a CNT 42, and an FM 43 connected to the CNT 42.

The switch 31 switches connections among the blocks according to instructions from the CNT 42 (software contained in the CNT).

The MSC-IF 32 is an interface connection unit with the MSC and is connected to the MSC through an ATM interface. The RNS-IF 33 is an interface connection unit with another RNS and is connected to another RNS through an IP/ATM interface. The CABS-IF 34 is an interface connection unit with a CABS and is connected to the CABS through an IP interface. As for the RNS-IF 33 and the CABS-IF 34 surrounded by double lines, a plurality of RNS-IFs 33 and CABS-IFs 34 may be provided in a single RNS.

The blocks 35 to 40 on the right side of the switch 31 are termination units of channels and protocols. The PAGE 35 performs PAGING channel processing. The DHT 36 performs processing related to hand-over. The MMUX 37 controls various common channels (multiplexing/demultiplexing). The ISU 38 provides termination control of signals exchanged with MSC. The RSU 39 terminates signals exchanged with RNS. The BSU 40 terminates signals exchanged with base stations (CABS, BTS).

The CNT 42 is a control unit having a high-speed CPU (Central Processing Unit) and provided with software for controlling the entire RNS device. The FM 43 connected to the CNT 42 is a file memory in which software for controlling individual blocks in the RNS 30 is stored in a generation-managed manner.

The control of the flowchart of the RNS shown in FIG. 13 is executed by the software accommodated in the CNT 42. The process shown in FIG. 13 is realized by modifying the software of the CNT 42. However, it may be configured to be realized by hardware.

The OPS-IF 41 is an interface connection unit to a maintenance terminal and control device (OPS: operation system). The OPS-IF 41 is connected to the maintenance terminal and OPS through an IP interface.

<Configuration of MSC>

Figure 19:
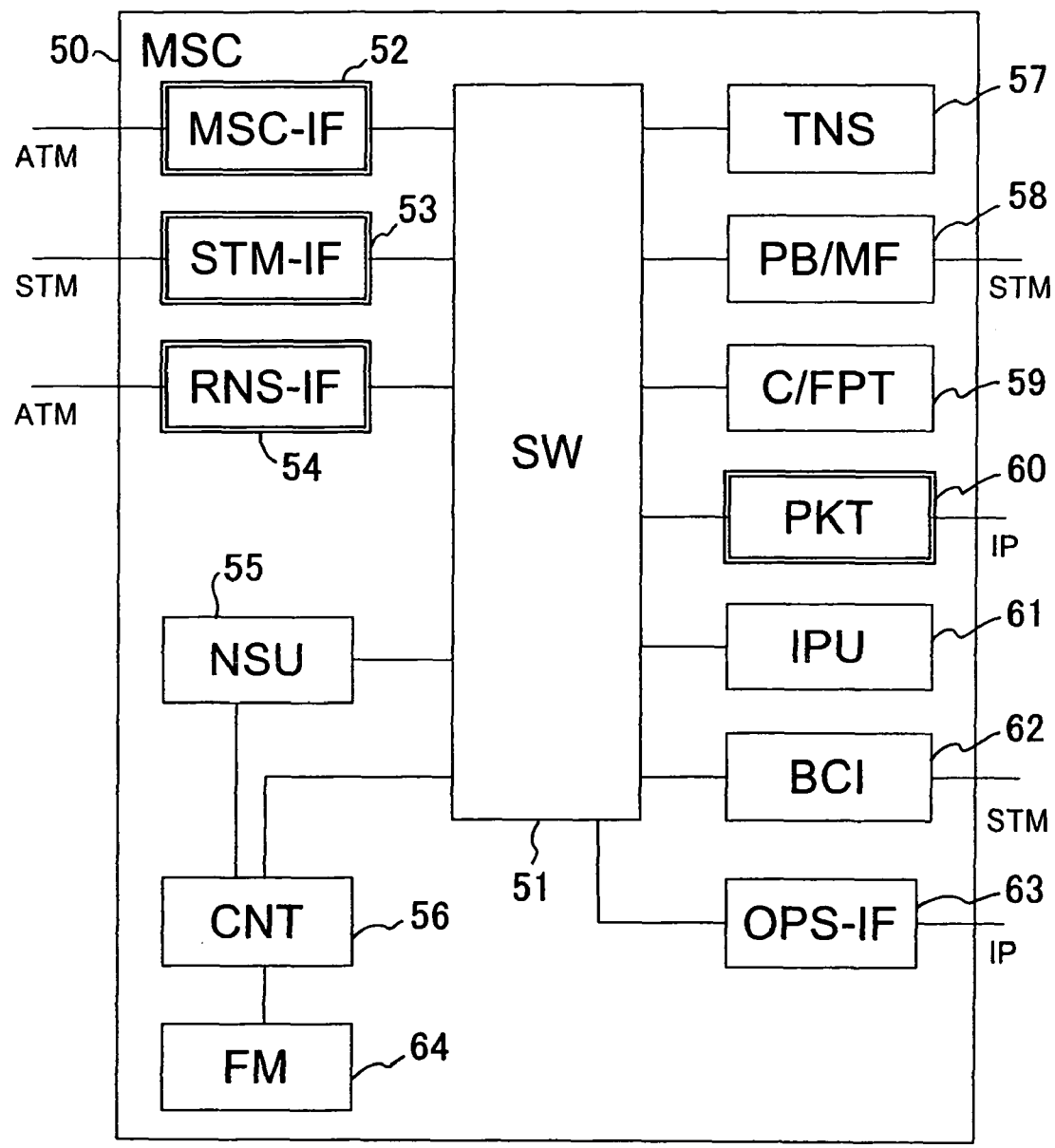
FIG. 19 is a block diagram showing an example configuration of the MSC according to the embodiment of the present invention.

FIG. 19 is a block diagram showing a configuration example of the switch (MSC) of the embodiment of the present invention. In FIG. 19, the MSC 50 includes a switch (SW) 51, an MSC-IF 52 connected to the switch 51, an STM-IF 53, an RNS-IF 54, an NSU 55, a TNS 57, a PB/MF 58, a C/FPT 59, a PKT 60, an IPU 61, a BCI 62, an OPS-IF 63, and an FM 64 connected to the CNT 56.

The switch 51 switches connections among the blocks according to instructions from the CNT 56 (software provided in the CNT). The MSC-IF 52 is an interface connection unit with another MSC and is connected to another MSC through an ATM interface. The STM (Synchronous Transfer Mode)-IF 53 is an interface connection unit with another network and is connected to another network through an STM interface. The RNS-IF 54 is an interface connection unit with an RNS and is connected to the RNS through an ATM interface. As for each of the interfaces 52 to 54, a plurality of interfaces may be provided.

The blocks 57 to 62 on the right side of the switch 51 are blocks that realize main functions of the MSC.

The TNS 57 is atone sender unit that distributes audible tone (e.g., RBT) to terminals. The PB/MF 58 is a PB/MF signal send/receive unit that analyzes received signals to PB (Push Button) tone etc., which also distributes voice signals from outside. The C/FPT 59 is a functional block having trunk functions related to police/fire authorities.

The PKT is an IP packet interface unit and is connected to the IP network. The IPU 61 is an IP packet terminate control unit. The BCI 62 is an interface for connection to a charge account center, which is a kind of interface to another system.

The NSU 55 is a unit that performs processing of common line interface that receives ATM signals. The CNT 56 is a control function block having a high-speed CPU and provided with software for controlling the entire MSC device. The FM is a file memory in which the software provided in the CNT 56 is stored in a generation-managed manner.

The control of the flowchart by the MSC shown in FIGS. 14 to 16 is executed by the software accommodated in the CNT unit 56. The control can be realized by modifying existing software. The OPS-IF 63 is a functional block that provides interface to maintenance terminal and control device (OPS).

<Effects of the Embodiment>

According to the embodiment of the present invention, in the sequence shown in FIG. 9, the RNS2 checks whether ISP-IDs coincide with each other to judge whether an inter-CABS direct connection bearer can be established. When the judgment is affirmative, a data transmission path (VoIP path session) for the data communication between the terminal UE-a and the terminal UE-b is established between the CABS1 and the CABS2. The network system shown in the embodiment thus has a judging unit and an establishing unit according to the present invention.

When the inter-CABS direct bearer (data transmission path) is established, the traffic between the terminals UE-a and terminal UE-b does not flow through the mobile telephone network. Also, the traffic flows through the IP network just once. The reduction of traffic reduces burdens imposed on the mobile phone network and the IP network.

On the other hand, when the RNS2 judges a mismatch of ISP-IDs, and when the "SETUP" contains no ISP-ID, the RNS2 judges that inter-CABS direct bearer is impossible. In this case, the destination side performs the sequence shown in the right part of FIG. 8, where a data transmission path between the terminal UE-a and the terminal UE-b is established via the mobile phone network (the route through RNS1-MSC1-MSC2-RNS2). Thus, the data transmission path between terminals is established by an existing procedure when inter CABS direct bearer cannot be established. Thereby the call connection in response to the calling request from the calling terminal is guaranteed.

Also, in the embodiment, the RNS1 may be configured to add a session number to the "SETUP", in addition to the IP address and ISP-ID. In this case, the session number is reported to the source CABS (CABS1) and the destination CABS (CABS2), and the source CABS and the destination CABS establish an inter-CABS direct bearer (VoIP path session) using the session number.

Accordingly, for example, when an inter-CABS direct bearer between CABS1-CABS2 is established for communication between the terminals UE-a and UE-b (the bearer is referred to as "a first inter-CABS bearer"), and when a further call connection is made between a terminal UE-c (not shown) subordinate to the CABS1 and a terminal UE-d (not shown) subordinate to the CABS2, an inter-CABS direct bearer for the communication between the terminals UE-c and UE-d (the bearer referred to as "a second inter-CABS bearer") is established with a session number different from the session number of the first inter-CABS bearer. Thus, different inter-CABS direct bearers are distinguished with different session numbers, which allows simultaneous establishment of a plurality of inter-CABS direct bearers between CABSs.

Also, in the embodiment of FIG. 9, the CABS1-RNS1 bearer (the second data communication path) B2 and the RNS1-MSC1 bearer B3 are established, the ring tone from the MSC1 is sent to the CABS1 through these bearers B2 and B3, and the CABS1 sends the ring tone to the terminal UE-a through the bearer B1 (the first data communication path) between the CABS1 and the terminal UE-a. Thus, the ring tone from the mobile phone network is provided to the terminal UE-a so that the user can hear the ring tone.

After that, when the inter-CABS direct bearer (the data transmission path VS) is established and the terminal UE-b responds to the call, the connection of the bearer B1 is switched from the bearer B2 to the data transmission path VS and the bearers B2 and B3 are released. This reduces wastes of resources of the IP network and the mobile phone network.

[Others]

The description in "Best Mode of Carrying out the Invention" discloses the following claimed invention. The configurations of the present invention disclosed below can be properly combined as needed.

What is claimed is:

1. A system for establishing a data transmission path between mobile phone terminals, the system comprising:
    a plurality of mobile phone base stations, each of which is connected to a mobile phone network through one or more IP (internet protocol) networks, wherein a mobile phone base station among the plurality of mobile phone base stations functions as a source base station to receive a calling request from a mobile phone terminal as a calling terminal, another mobile phone base station among the plurality of mobile phone base stations functions as a destination base station to receive the calling request from the source base station and to transfer the calling request to another mobile phone terminal as a called terminal, and the calling request from the source base station reaches the destination base station going through the one or more IP networks and the mobile phone network;
    a judging unit to judge whether the source base station is connectable with the destination base station through one of the one or more IP networks by comparing a first identifier indicating an IP network among the one or more IP networks to couple the source base station with the mobile phone network with a second identifier indicating an IP network among the one or more IP networks to couple the destination base station with the mobile phone network in case where the called terminal responds to the calling request;
    an establishing unit to establish a data transmission path between the calling terminal and the called terminal without going through the mobile phone network, the data transmission path including a part that the source base station is connected with the destination base station through the one of the one or more IP networks, if the judging unit judges that the first identifier coincides with the second identifier.

2. The system for establishing a data transmission path between mobile phone terminals according to claim 1, wherein, when the first identifier does not coincide with the second identifier, a data transmission path between the calling terminal and the called terminal is established via the mobile phone network.

3. The system for establishing a data transmission path between mobile phone terminals according to claim 1, wherein, when at least one of the calling terminal and the called terminal belongs to a mobile phone base station that is connected to the mobile phone network not through an IP network, a data transmission path between the calling terminal and the called terminal is established via the mobile phone network.

4. A network system comprising:
    a mobile phone network having:
    at least two mobile phone base station control devices, each of which is connected with one or more mobile phone base stations through one or more IP (internet protocol) networks, wherein the at least two mobile phone base station control devices include a first base station control device to receive a calling request from one of the one or more mobile phone base stations functioning as a source base station when receiving the calling request from a mobile phone terminal as a calling terminal, and a second base station control device to receive the calling request from the first base station control device through at least one switch and to transmit the calling request to another one of the one or more mobile phone base stations functioning as a destination base station to transfer the calling request to another mobile phone terminal as a called terminal,
    wherein,
    when the first base station control device receives the calling request from the source base station the first base station control device adds, to the calling request, a first identifier indicating an IP network among the one or more IP networks to couple the source base station with the first base station control device,
    when the second base station control device receives the calling request through the at least one switch and sends the calling request to the called terminal through the destination base station, the second base station control device judges whether the first identifier contained in the calling request coincides with a second identifier indicating an IP network among the one or more IP networks to couple the destination base station with the second base station control device, and when the first identifier coincides with the second identifier, the second base station control device informs the destination base station of the IP address of the source base station contained in the calling request and also informs the source base station of an IP address of the destination base station, and the first and second base station control devices provide an instruction to the source base station and the destination base station to establish a data transmission path between the calling terminal and the called terminal without going through the mobile phone network, the data transmission path including a part that the source base station is connected with the destination base station through the one of the one or more IP networks.

5. The network system according to claim 4, wherein, when the first identifier contained in the calling request does not coincide with the second identifier, the first base station control device, the second base station control device, and the at least one switch operate to establish a data transmission path between the calling terminal and the called terminal via the mobile phone network.

6. The network system according to claim 4, wherein, when the calling request received at the second base station control device contains no identifier indicating the one or more IP networks, the first base station control device, the second base station control device, and the at least one switch operate to establish a data transmission path between the calling terminal and the called terminal via the mobile phone network.

7. The network system according to claim 4, wherein the first base station control device adds, to the calling request, the first identifier, the IP address, and identification information about the data transmission path to be established between the source base station and the destination base station.

8. The network system according to claim 4, wherein the second base station control device informs the source base station of the IP address of the destination base station through the at least one switch and the first base station control device.

9. The network system according to claim 4, wherein the second base station control device informs the source base station of the IP address of the destination base station via the one of the one or more IP networks by using the IP address of the source base station that is obtained from the calling request.

10. The network system according to claim 4, wherein the second base station control device informs the destination base station of the IP address of the source base station, and
the destination base station informs the source base station of the IP address of the destination base station via the one of the one or more IP networks by using the IP address of the source base station.

11. The network system according to claim 4, wherein, upon reception of the calling request, the first base station control device and the at least one switch establish a data communication path extending between the first base station control device and the source base station and between the first base station control device and the switch,
the at least one switch sends a ring tone to the source base station using the data communication path during a calling to the called terminal, and
the source base station sends, to the to the calling terminal, the ring tone received through the data communication path.

12. The network system according to claim 11, wherein, when the called terminal responds to the calling, the called terminal sends a connect message to the calling terminal, and upon reception of the connect message, the source base station switches data communication path that should be connected to the calling terminal, from the data communication path established with the first base station control device to the data transmission path established between the source base station and the destination base station.

13. The network system according to claim 11, wherein, when the called terminal responds to the calling, the called terminal sends a connect message to the calling terminal, and upon reception of the connect message, the at least one switch and the first base station control device delete the data communication path established between the first base station control device and the source base station and between the first base station control device and the at least one switch.

14. The network system according to claim 4, wherein, in the case where the calling terminal and the called terminal communicate using the data transmission path established between the source base station and the destination base station, when one of the calling terminal and the called terminal sends a disconnect request, the source base station and the destination base station disconnect the data transmission path after disconnecting a link between the calling terminal and the source base station and a link between the called terminal and the destination base station.

15. A mobile phone base station connected to a mobile phone network through one of one or more IP (internet protocol) networks, comprising:
a receiving unit that receives a calling request from a mobile phone terminal as a calling terminal;
a sending unit that sends the calling request to the mobile phone network through the one of the one or more IP networks to couple the mobile phone base station itself with the mobile phone network; and
a data transmission path establish/disconnect unit,
wherein,
when the calling request arrives at a mobile phone terminal as a called terminal via a different mobile phone base station, the called terminal responds to the calling request, and the different mobile phone base station is judged that the mobile phone base station is connectable with the different mobile phone base station through the one of the one or more IP networks by comparing a first identifier indicating an IP network among the one or more IP networks to couple the mobile phone base station with the mobile phone network with a second identifier indicating an IP network among the one or more IP networks to couple the different mobile phone base station with the mobile phone network, the data transmission path establish/disconnect unit receives an IP address of the different mobile phone base station from the mobile phone network or from the different base station, and the data transmission path establish/disconnect unit establishes, using the IP address, a data transmission path between the calling terminal and the called terminal without going through the mobile phone network, the data transmission path including a part that the mobile phone base station is connected with the different mobile phone base station trough the IP network.

16. The mobile phone base station according to claim 15, further comprising:
a data communication path establish/disconnect unit that, after sending the calling request to the mobile phone network, establishes a first data communication path between the mobile phone base station itself and the calling terminal and a second data communication path between the mobile phone base station itself and the mobile phone network;
a switching unit that switches a destination between the second data communication path and the data transmission path to which the first data communication path to be connected; and
a switching control unit that causes the switching unit to select the second data communication path during a calling to the called terminal so that a ring tone sent from the mobile phone network is sent onto the first data communication path, and that causes the switching unit to select the data transmission path when the called terminal responds to the calling.

17. The mobile phone base station according to claim 16, wherein the data communication path establish/disconnect unit disconnects the second data communication path when the called terminal responds to the calling.

18. The mobile phone base station according to claim 16, wherein the data transmission path establish/disconnect unit disconnects the data transmission path after the data communication path establish/disconnect unit disconnects the first data communication path.

19. The mobile phone base station according to claim 16, wherein data transmitted on the first data communication path is enciphered according to a cipher defined between the calling terminal and the mobile phone network, and wherein the mobile phone base station further comprises:
a cipher/decipher unit that deciphers the enciphered data from the first data communication path and that enciphers, according to the cipher, data to be sent onto the first data communication path;

a first route passing through the cipher/decipher unit;

a second route not passing through the cipher/decipher unit;

a connection unit that connects data transmitted between the calling terminal and the called terminal through the mobile phone network to the second route and that connects data transmitted between the calling terminal and the called terminal through the data transmission path to the first route; and a connection control unit that controls the route connection made by the connection unit in accordance with establishment/disconnection of the data transmission path.

20. A method for establishing a data transmission path between mobile phone terminals in a network system including a plurality of mobile phone base stations, each of which is connected to a mobile phone network through one or more IP (internet protocol) networks, the method comprising:

sending, from a mobile phone base station among the plurality of mobile phone base stations functioning as a source base station to the mobile phone network through one of the one or more IP networks, a calling request made by a mobile phone terminal as a calling terminal wherein the calling request from the source base station reaches another mobile phone base station functioning as a destination base station going through the one or more IP networks and the mobile phone network;

sending the calling request from the destination base station to another mobile phone terminal as a called terminal in case where the destination base station receives the calling request from the source base station thorough the mobile phone network;

judging whether the source base station is connectable with the destination base station through the one of the one or more IP networks by comparing a first identifier indicating an IP network among the one or more IP networks to couple the source base station with the mobile phone network with a second identifier indicating an IP network among the one or more IP networks to couple the destination base station with the mobile phone network in case where the called terminal responds to the calling request; and establishing a data transmission path between the calling terminal and the called terminal without going through the mobile phone network, the data transmission path including a part that the source base station is connected with the destination base station through the one of the one or more IP networks, if the judging unit judges that the first identifier coincides with the second identifier.

21. The method for establishing a data transmission path between mobile phone terminals according to claim 20, wherein, when the first identifier does not coincide with the second identifier, a data transmission path between the calling terminal and the called terminal is established via the mobile phone network.

22. The method for establishing a data transmission path between mobile phone terminals according to claim 20, wherein, when the called terminal belongs to a mobile phone base station that is connected to the mobile phone network without through the one or more IP networks, a data transmission path between the calling terminal and the called terminal is established via the mobile phone network.

23. A method for establishing a data transmission path between mobile phone terminals in a network system including a mobile phone network having at least two mobile phone base station control devices, each of which is connected with one or more mobile phone base stations through one or more IP (internet protocol) networks, wherein the at least two mobile phone base station control devices include a first base station control device to receive a calling request from one of the one or more mobile phone base stations functioning as a source base station when receiving the calling request from a mobile phone terminal as a calling terminal, and a second base station control device to receive the calling request from the first base station control device through at least one switch and to transmit the calling request to another one of the one or more mobile phone base stations functioning as a destination base station to transfer the calling request to another mobile phone terminal as a called terminal, the method comprising:

the first base station control device adding, to the calling request, a first identifier indicating an IP network among the one or more IP networks to couple the source base station with the first base station control device, when the first base station control device receives the calling request from the source base station through one of the one or more IP networks; the second base station control device judging whether the first identifier contained in the calling request coincides with a second identifier indicating an IP network among the one or more IP networks to couple the destination base station with the second base station control device, when the second base station control device receives the calling request from the first base station control device through the at least one switch;

the second base station control device informing the destination base station of the IP address of the source base station contained in the calling request and also informing the source base station of an IP address of the destination base station, when the first identifier coincides with the second identifier; and the first base station control device and the second base station control device providing an instruction to each of the source base station and the destination base station to establish a data transmission path between the calling terminal and the called terminal without going through the mobile phone network, the data transmission path including a part that the source base station is connected with the destination base station through the one of the one or more IP networks.

24. The method for establishing a data transmission path between mobile phone terminals according to claim 23, wherein, when the first identifier contained in the calling request does not coincide with the second identifier, the first base station control device, the second base station control device, and the at least one switch operate to establish a data transmission path between the calling terminal and the called terminal via the mobile phone network.

25. The method for establishing a data transmission path between mobile phone terminals according to claim 23, wherein, when the calling request received at the second base station control device contains no identifier indicating the one or more IP networks, the first base station control device, the second base station control device, and the at least one switch operate to establish a data transmission path between the calling terminal and the called terminal via the mobile phone network.

26. The method for establishing a data transmission path between mobile phone terminals according to claim 23, wherein the first base station control device adds, to the calling request, the first identifier, the IP address, and identification information about the data transmission path to be established between the source base station and the destination base station.

27. The method for establishing a data transmission path between mobile phone terminals according to claim 23, wherein the second base station control device informs the source base station of the IP address of the destination base station through the at least one switch and the first base station control device.

28. The method for establishing a data transmission path between mobile phone terminals according to claim 23, wherein the second base station control device informs the source base station of the IP address of the destination base station via the IP network by using the IP address of the source base station that is obtained from the calling request.

29. The method for establishing a data transmission path between mobile phone terminals according to claim 23, wherein the second base station control device informs the destination base station of the IP address of the source base station, and the destination base station informs the source base station of the IP address of the destination base station via the IP network by using the IP address of the source base station.

30. The method for establishing a data transmission path between mobile phone terminals according to claim 23, wherein, upon reception of the calling request, the first base station control device and the at least one switch establish a data communication path extending between the first base station control device and the source base station and between the first base station control device and the switch, the at least one switch sends a ring tone to the source base station using the data communication path during a calling to the called terminal, and the source base station sends, to the calling terminal, the ring tone received through the data communication path.

31. The method for establishing a data transmission path between mobile phone terminals according to claim 30, wherein, when the called terminal responds to the calling, the called terminal sends a connect message to the calling terminal, and upon reception of the connect message, the source base station switches data communication path that should be connected to the calling terminal, from the data communication path established with the first base station control device to the data transmission path established between the source base station and the destination base station.

32. The method for establishing a data transmission path between mobile phone terminals according to claim 30, wherein, when the called terminal responds to the calling, the called terminal sends a connect message to the calling terminal, and upon reception of the connect message, the at least one switch and the first base station control device delete the data communication path established between the first base station control device and the source base station and between the first base station control device and the at least one switch.

33. The method for establishing a data transmission path between mobile phone terminals according to claim 23, wherein, in the case where the calling terminal and the called terminal communicate using the data transmission path established between the source base station and the destination base station, when one of the calling terminal and the called terminal sends a disconnect request, the source base station and the destination base station disconnect the data transmission path after disconnecting a link between the calling terminal and the source base station and a link between the called terminal and the destination base station.

* * * * *